United States Patent
Babbar et al.

(10) Patent No.: US 7,430,602 B2
(45) Date of Patent: Sep. 30, 2008

(54) DYNAMICALLY PROVISIONED MOBILE STATION AND METHOD THEREFOR

(75) Inventors: Uppinder S. Babbar, San Diego, CA (US); Marcello Lioy, San Diego, CA (US); Nischal Abrol, San Diego, CA (US); Oliver Michaelis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 694 days.

(21) Appl. No.: 10/616,388

(22) Filed: Jul. 9, 2003

(65) Prior Publication Data

US 2004/0116140 A1 Jun. 17, 2004

Related U.S. Application Data

(60) Provisional application No. 60/434,992, filed on Dec. 20, 2002.

(51) Int. Cl.
*G06F 13/00* (2006.01)
(52) U.S. Cl. .................. 709/227; 709/225; 709/237; 709/249
(58) Field of Classification Search .......... 709/217, 709/219, 227, 228, 246, 249, 223, 225, 229, 709/230, 237; 719/311
See application file for complete search history.

(56) References Cited

U.S. PATENT DOCUMENTS

| | | | |
|---|---|---|---|
| 6,111,866 A | | 8/2000 | Kweon et al. |
| 6,144,849 A * | | 11/2000 | Nodoushani et al. ........ 455/419 |
| 6,275,693 B1 * | | 8/2001 | Lin et al. .................. 455/414.3 |
| 6,377,556 B1 | | 4/2002 | Lioy et al. |
| 6,463,034 B1 | | 10/2002 | Abrol et al. |
| 6,466,779 B1 * | | 10/2002 | Moles et al. ................ 455/410 |
| 6,483,822 B1 | | 11/2002 | Lioy et al. |
| 6,636,492 B1 * | | 10/2003 | Son et al. .................... 370/329 |
| 6,647,260 B2 * | | 11/2003 | Dusse et al. ................ 455/419 |
| 6,757,266 B1 * | | 6/2004 | Hundscheidt .............. 370/328 |
| 6,954,654 B2 * | | 10/2005 | Ejzak .......................... 455/560 |

(Continued)

FOREIGN PATENT DOCUMENTS

WO 0051312 8/2000

OTHER PUBLICATIONS

Digital Cellular Telecommunications System: Universal Mobile Telecommunications System, ETSI TS 127 001, Telecommunications Standards Institute, vol. 3(V530): pp. 1-81 (2002).

(Continued)

*Primary Examiner*—Viet Vu
(74) *Attorney, Agent, or Firm*—Thomas R. Rouse; Nicholas J. Pauley; Darren M. Simon

(57) ABSTRACT

Multimode mobile station includes mobile configuration manager, device interface, and network interface to dynamically provision network configuration for mobile TE2-type mobile terminals and accomodates multiple protocols over multiple carrier access methods over $U_m$ interface and multiple access methods over $R_m$ interface. A method for communicating between endpoints, where a mobile node obtains a unique configuration from a network for a managed device. The mobile node dynamically provisions the configuration for the connected managed device, in response to device request or network notice. The node adapts messages over $R_m$ interface for TE2 signals and over $U_m$ interface for a wireless protocol.

51 Claims, 10 Drawing Sheets

U.S. PATENT DOCUMENTS

2002/0123335 A1* 9/2002 Luna et al. .................. 455/419
2002/0181510 A1 12/2002 Abrol et al.
2003/0027581 A1* 2/2003 Jokinen et al. .............. 455/456
2003/0083081 A1* 5/2003 Sanders et al. .............. 455/466

OTHER PUBLICATIONS

Digital Cellular Telecommunications System: Universal Mobile Telecommunications System, ETSI TS 127 002, Telecommunications Standards Institute, vol. 3(V500): pp. 1-26 (2001).

Digital Cellular Telecommunications System: Universal Mobile Telecommunications System, ETSI TS 127 003, Telecommunications Standards Institute, vol. 3(V500): pp. 1-18 (2001).

Digital Cellular Telecommunications System: Universal Mobile Telecommunications System, ETSI TS 127 007, Telecommunications Standards Institute, vol. 3(V520): pp. 1-23, 112-140, 151-168.

Data Transmission Systems and Equipment-Serial Asynchronous Automatic Dialing and Control for Character . . . ; TIA/EIA-678, XP 0022885117, pp. 1-82.

Data Transmission Systems and Equipment-Serial Asynchronous Automatic Dialing and Control for Character . . . ; TIA/EIA-678-1, XP 0022885118, pp. 1-2.

Mouly, M., et al. Communication Management, GSM System for Mobile Communications, XP000860008, pp. 500-565.

International Search Report PCT/US2003/040924, International Search Authority-EPO, Jun. 7, 2004.

* cited by examiner

DYNAMICALLY PROVISIONED MOBILE STATION AND METHOD THEREFOR

RELATED APPLICATIONS

The present application claims priority of provisional application Ser. No. 60/434,992 filed Dec. 20, 2002, incorporated herein by reference.

BACKGROUND

1. Field

The invention herein is related to telecommunication systems, particularly to wireless communications devices, and most particularly to mobile communication stations.

2. Description of the Relevant Art

Within 20 years, over a billion wireless service subscribers made mobile voice and mobile data services integral parts of their business and social life. In many parts of the world, wireless communications are more prevalent—and more reliable—than fixed or land-based communications services, with international roaming services being available in over 160 countries. Thus, mobile wireless communications quickly are becoming essential tools in modern society.

By way of background, a communication is the transfer of messages, or information-bearing signals representing signs, writing, images and sounds, or intelligence of any nature, according to agreed conventions. Herein, transferring a message may include sending a message, receiving a message, or both; with the logical meaning assigned to one or more messages being called content. Communication is effected by least two communication endpoints. A host is communication endpoint attached to a communication network that can be a server (producer) or a client (consumer) of messages. A host generally executes application programs on behalf of one or more user, integrated, or embedded systems, or communication content provider, employing communication services in support of this function. These executed programs are among the processes, or active elements, in a host. A intermediate node also can be a communication endpoint, for example, when the node produces or consumes messages, and not merely relays or re-transmits the messages to another host or node. In general, a communication link represents the association between contiguous connecting points, or between an endpoint and a contiguous connecting point. Two or more hosts communicate over a concatenation of links, called a connection, which represents the physical and logical association between endpoints, and which provides the capability of transferring information between endpoints. A connection may incorporate links using a variety of communication media.

Telecommunication is the transfer of messages by wire, radio, optical, or other electromagnetic systems. Telecommunication service providers, which may be public or private entities, make available telecommunication services to users by subscription, and enable users to transfer messages. Users may be humans or machines, which are designated by humans to use the telecommunication services. Wireless telecommunication services include those in which at least one communication link between provider and user employs radio, optical, or other electromagnetic systems. Such services may be fixed or mobile, and may transfer messages using both terrestrial and satellite links. A wireless link generally conveys messages according to wireless communication protocol, i.e., a formal set of conventions governing the format and timing of message exchange between two communication endpoints. A protocol typically is implemented using a carrier access method, which also can be represented by a formal set of conventions governing the physical signal characteristics, and method of signal transmission over a physical air interface, i.e., the $U_m$ interface.

By implementing a set of network capabilities, which are defined by standardized protocols and functions, a service provider can configure a network to participate in an integrated services network offering diverse, distributed communication services. When a demand for a telecommunication service is invoked by a user, then the particular instance of the service also may be called a communication. Such communications may enlist the services of multiple, internetworked service providers, and may transfer messages over many links. Mobile wireless communication services (mobile services) are adapted for applications in which at least one user is capable of changing location during a communication (i.e., a mobile user). Furthermore, mobile services can include telecommunication provider services that may be delivered using fixed, wireless, and mobile communications services, or a combination thereof. The concept of mobile communications represents: (1) the ability of a user to access telecommunication services at any terminal from different locations; (2) the capability of the network to provide those services according to the user's service profile; (3) the network capability to identify and locate the terminal associated with the user for the purposes of addressing, routing and charging of the user's calls; and (4) the ability to do so while in motion.

Mobile telecommunication service users gain access to these services by executing a service level agreement with the mobile service provider. A significant aspect of this agreement may include the Quality of Service (QoS) provisions relating to the delivery of services and content, with selected network traffic receiving better service than others, typically at a higher cost. QoS parameters may include a broad range of attributes specified by content service providers, network service providers, and users, including cost; reliability; priority; protection from unauthorized access; transmission and delivery error rates; system throughput; expected delays and variations; basic service availability; and availability of alternative services and carrier access methods. Some QoS parameters can be set in advance and some may be dynamically adapted to, or selected to accommodate, existing conditions.

The improved service may be effected by providing dedicated bandwidth, controlled jitter and latency, and improved loss characteristics, but usually not at the expense of disrupting other flows having lower priority. QoS can refer to the level of service to which provider and subscriber agree, as well as to the cost that a subscriber is willing to pay to receive enhanced services. For example, a mobile user may subscribe to standard level services providing text and voice for a particular recurring fee, but may agree to pay an additional per-use charge for premium services, such as multimedia and international roaming. Each service at each level may require a different QoS level.

For many applications, particularly those related to the transmission of text or files, in which the associated messages arrive on a "best efforts" basis and often of order, such an impairment may not be perceived by the recipient or, if it is, the QoS reduction may not be significant or even noticeable. However, in isochronous (delay-sensitive) applications, such as voice, video, and multimedia, the delays in a mobile environment may have a greater perceptual impact upon the user and, thus, the satisfaction of the user with the service. For example, voice-over IP service (VoIP) has very tight delay constraints, i.e., a small delay budget. In general, voice quality will start to degrade if the round trip delay exceeds 250 ms. Although an overall delay budget may be brought to bear upon the end-to-end path, much of the time budget may be consumed by the complexities that the traffic encounters to make the last "hop" to the end user device.

The basic instrument that is used to access mobile wireless services is the mobile station (MS). A base station (BS), or base transceiver station, is a fixed station that employs a radio transceiver to communicate with MSs. Traffic is the set of messages communicated between an MS and a BS, which is transported over the communication network. The communication path between an MS and a BS, used transport user messages and control signals is called the traffic channel, or channel. The traffic channel may include an uplink, or a forward traffic path, between the MS and the BS, and a downlink, or reverse traffic path, between the BS and MS. One or more physical channels can cooperate to act as a single logical channel and vice versa, depending upon the services to which the user has subscribed. Each traffic channel has a set of transmission formats, i.e., a radio configuration, that is characterized by physical layer parameters such as transmission rates, modulation characteristics and spreading rate. The channel forms a communication link over the air interface, also called the $U_m$ interface, between an MS and a BS.

Typically, one or more BS are connected with a Mobile Switching Center (MSC), an automatic system which constitutes the interface for user traffic between the cellular network and other public switched networks, or other MSCs in the same or other cellular networks. In general, an MSC and its associated BSs can be considered as a single functional entity, the BS/MSC. The BS/MSC cooperate to form one or more clusters of cells that provide wireless services, for example, over a metropolitan region or transportation corridor. Multiple BS/MSC can be coupled to form a service network or system, covering a substantial geographic area.

Frequently, the BS in a particular service network employ a common wireless configuration or mode of operation, hereinafter called a carrier access method. There are many carrier access methods currently in use. On the user/subscriber side, an MS often is configured to perform in one carrier access method, although MS accommodating multimode communications are becoming more common, as subscribers demand increasing flexibility with wireless services while roaming away from their home wireless network. A multimode MS is one, which can communicate using two or more carrier access methods.

On the "land" side of the $U_m$ interface, mobile service providers connect their wireless networks to other wireless networks, including those using different carrier access methods, and to globally-available integrated services networks. Because two communicating users may be interconnected by heterogeneous media, a single communication can be transmitted over wire, fiberoptic, and wireless media using multiple, medium-related communication protocols. In general, hosts are heterogeneous as well, with some hosts communicating one or more types of digital information, including data, text, voice, facsimile, video, multimedia, and a combination thereof.

In principle, mobile networking can allow the roaming user to receive mobile services in much the same way as at home. When a user powers on an MS, the MS provides the local wireless system with mobile or subscriber identification information; the local system uses the wireless network to find and inform the user's home system of the user's current serving MSC. This allows calls to the mobile that arrive at the home system to be redirected to the current serving system. From the MS user's point of view, a home MSC may appear as a local calling area, although local-calling areas, as designated by the service provider, may be larger than a single MSC.

Increasingly, wireless and mobile devices have at least a portion of their connection linked over public networks, including the Internet. The Internet is a loosely-organized international collaboration of autonomous, interconnected, packet-based networks, including wireless networks, which may generally be represented by the multilayer architecture, service descriptions, and protocols described by ITU-T Rec. X.200: "Information Technology—Open Systems Interconnection—Basic Reference Model: The Basic Model," International Telecommunication Union, July 1994 (OSI Basic Reference Model).

These networks support host-to-host communication through voluntary adherence to open protocols and procedures defined by standards and practices, which are grounded in a few underlying principles. These principles tend to be inherent in Internet-related protocols. In general, these protocols give "end-to-end" responsibility for the integrity, message flow management, and the security, of communication to the end hosts, thereby making the communication substantially "transparent" to intermediate systems. Internet protocols are well-known in the networking and telecommunications arts, and are identified in IETF Standard STD0001: "Internet Official Protocol Standards," J. Reynolds, R. Braden, S. Ginoza, A. De La Cruz, Eds., November 2002 (also called IETF RFC3300). The networks constituent of, and coupled to, the Internet generally are interconnected using packet-switching computers called "routers," "gateways," or "intermediate systems." To improve robustness of the communication system, gateways often are designed to be stateless, forwarding each IP message independently of other messages. Consequently, redundant paths can be exploited to provide robust service in spite of failures of intervening gateways and networks. To communicate using the Internet system, a host typically implements at least one protocol from each layer of the layered Internet protocol suite. The Application Layer is the topmost layer of the Internet protocol suite. Two categories of application layer protocols include user protocols that provide service directly to users, and support protocols that provide common system functions. Application layer protocols employ TCP to provide their transport layer communication services.

The predominant group of protocols used on the Internet is the collection of protocols called the Transmission Control Protocol/Internet Protocol (TCP/IP) protocol suite. The policy and implementation details of both the IP and the TCP protocols are well-known and are described respectively in, for example, IETF Standard STD0007: "Transmission Control Protocol," J. Postel, September 1981 (also called IETF RFC0793) and IETF Standard STD0005: "Internet Protocol," J. Postel, September 1981 (includes IETF RFC0791, IETF RFC0792, IETF RFC0919, IETF RFC0922, IETF RFC0950, and IETF RFC1112). STD0003 also describes link, IP, and transport layer communication protocols, as well as application and support protocols. In general, the TCP/IP protocol suite conveys information in datagrams, or structured blocks of data units. As used herein, however, the term message will apply to datagrams, packets, and frames, as well as any other unit or structured block of communication. TCP/IP-based traffic allows messages to be conveyed through the Internet and a mobile network, using packet switching with a substantial degree of transparency. To achieve the desired connectivity between source and destination, TCP is used at the Transport Layer (Layer 4) in combination with the Internet Protocol at the Network Layer (Layer 3). Typically, successive messages are transferred over this routing path.

TCP is intended to be a reliable connection-oriented transport layer service that provides end-to-end reliability, resequencing, and flow control. With TCP, a logical connection between source and destination is mapped prior to data transmission, a process called routing. IP is a connectionless protocol, in that no logical connection between an endpoint and a network exists prior to data transmission. The IP protocol provides no end-to-end delivery guarantees for messages. Each message is identified by a destination address, namely the IP address, and can travel to the destination substantially independently of other messages in the transmission. Messages contend for the use of network resources as they are routed through the network and, thus, may arrive at the destination host damaged, duplicated, out of order, or not at all.

The layers above IP, such as TCP, or an application layer support protocol, are responsible for reliable delivery service when it is required. TCP uses IP to carry its data end-to-end, and then receives, reorders, repairs, and requests re-transmission of the messages conveyed by IP, as necessary. Because of the transparency principle, messages can flow essentially unaltered throughout the network using TCP/IP-based protocols, and their source and destination IP addresses could be used as unique labels for the hosts. Moreover, end-to-end connectivity tends to reduce the impact of single-point failures in a routing path and to simplify securing message transport.

However, despite its simplicity, advantages, and ubiquity, the TCP/IP protocol suite evolved using basic assumptions that can be problematic in a mobile networking environment. For example, the IP suite was designed with the assumption that devices attached to the network are stationary. In addition, higher layer protocols, such as TCP, inherit this assumption, so that network connection properties are shared among many entities, and across network protocols, transport protocols, and applications. For example, TCP uses IP addresses to identify its connection endpoints. However, applications use sockets for their network I/O, with a socket typically being composed of an IP address and a specific TCP port number. Thus, during a communication, a mobile station IP address may change, which can break the associated TCP connections and can result in lost messages and an undesirable disruption of service.

To manage message flow over a connection, the TCP protocol effects congestion control and congestion avoidance employing both reactive and preventive techniques, such as those described by IETF Standard STD0003: "Requirements for Internet Hosts," R. Braden, Ed., October 1989 (also called IETF RFC1122 and ETF RFC1123). With these techniques, a TCP sender can adapt its use of network connection capacity, based on feedback from the TCP receiver. Absent an explicit congestion notification, though, a sending host may use a congestion window technique to control the flow of messages to the recipient. In general, a congestion window can be representative of the number of messages that can be correctly transmitted to a receiver, over a given period.

With one popular TCP congestion control strategy, the sender halves the congestion window size with each window transmitted with an error, i.e., at least one message in the window is deemed lost or damaged. For each subsequent message window that transmitted error-free, the sender can re-open the congestion window by one additional message. However, if additional errors are encountered before the congestion window recovers completely from a 50% reduction in size, even more 50% reductions in window size may be triggered, and the effect can be a "downward spiral," until the congestion window collapses, (i.e, transmission halts). For batch-mode communications, in which the messages can be re-transmitted without significant consequence, a strategy of this type can be beneficial to the network as a whole and not necessarily detrimental to either sender or receiver. In a mobile environment, this strategy can lead to an undesirable or even unacceptable results, because delayed packets in delay-sensitive applications may be discarded.

Latency is an undesirable physical phenomenon, which may arise from many sources; the effect of these sources often is additive. For example, overall network delay can be a function of the capacity of the links in the network, the overall amount of queuing and switching, and the format processing that may occur as the packets transit the network. Latency will differ with the carrier access method used, relevant environmental factors, and the spatial-geographic path of the link. Also, the more frequently a message is buffered while in transit, the more quickly the latency budget is expended. Often, between 50 ms to 150 ms may be consumed merely to cross the network connection, excluding latency, which may be introduced by the wireless link and the endpoint devices themselves. Because the message flow impairment for some applications may be less acceptable than for others, the QoS perceived by a user may suffer unless mechanisms are provided to grant and enforce a higher QoS for delay-sensitive messages, or to avoid or minimize delay.

In another example, end-to-end latency (or end-to-end delay) is the sum of the delays at the different network devices and across the network links through which traffic passes, from the sending endpoint to the receiving endpoint. In telephony terms, latency is the measure of time it takes the talker's voice to reach the listener's ear. Each additional delay may reduce the remaining time budgeted for message transmission. As the end-to-end delay of a conversational voice message surpasses 50 ms, echo becomes increasingly noticeable. As the delay surpasses 200 ms, speaker and listener can become un-synchronized, with either talking or pausing at once. Beyond 400-700 ms, speech may become unintelligible. A generally accepted limit for one-way, end-to-end delay for real-time voice applications is about 250 ms, with a 150 ms budget cap being desirable.

Current MS tend to serve as host for attached terminal devices. These MS may employ queueing, address translation, message security functions, and the like, serving "middlebox" functions on behalf of their client terminal device, instead of primarily acting as a message router. Thus, endpoint host devices, including MSs, can introduce delays, for example, by performing significant buffering and message transcoding, and by introducing algorithmic delays from signal compression (sender) or decompression (receiver). Receiving devices may attempt to offset delay variability (jitter) by buffering messages, introducing even more delay. Unfortunately, sensitive voice and video applications may involve a substantial amount of signal processing time, further adding to overall host-imposed latency. However, although latency is undesirable, some contributing factors may be more amenable to control than others.

Typically, mobile applications operate in a highly variable context, rarely encountered in the wired portions of a connection. For example, mobile systems can encounter air interface link problems, which increase the risk of delayed or lost packets. The link problems include variable bandwidth and signal strength, bursty noise, handoff losses, interference, and fading due to time dispersion from multipath transmissions, and to Doppler signal spreading. Each link problem contributes to an increase in the rates of bit errors and packet losses, often increasing latency and degrading service indirectly, through the initiation of TCP congestion protocols, or directly, for example, through channel failure.

Consequently, it is undesirable for a host to perform proxy-like services for client devices, which require additional buffering and processing. Exemplary host proxy services, such as message queueing, address translation, and message forwarding services, can introduce enough latency to make the perceived QoS provided by the MS unsatisfactory to the user.

In addition, TCP congestion control evolved under the assumption that network congestion is the only cause for message loss. In a mobile environment, TCP message delays and losses can be misinterpreted by the TCP congestion algorithms, leading to an unnecessary reduction in link bandwidth utilization and increase in message latency. In current IP networks, all messages may be treated alike. Under peak loads and congestion, voice frames can be dropped equally with data frames. The data frames, however, are not time sensitive, and dropped data packets can be appropriately corrected by retransmission. Lost voice packets, however, cannot be dealt with in this manner. The impact of loss varies with the application, but for interactive voice, or high-quality streaming video applications, it is desirable to keep the fraction of lost packets to less than about 5%.

Complicating matters, roaming users may carry with them an collection of electronic devices to meet their needs, including, for example, voice handset, pager, personal digital assistant, video terminal, laptop computer, intelligent print output, and associated accessories. With few exceptions, these devices are capable of communicating using standard physical interface technology. This interface technology includes, for example, ITU-T X- and V-series interfaces; Peripheral Components Interconnect (PCI/PCI-X) interfaces; Universal Serial Bus (USB) connection interfaces; and the many open and proprietary interface standards promulgated, for example, by professional organizations (IEEE, IEC, ANSI, etc.) and by private industry (e.g., BLUETOOTH®). Current MSs offer limited connectivity to these standard interfaces on the $R_m$ side, sometimes leaving the user with a Hobson's dilemma when choosing from their personal collection of electronic devices. When these mobile terminals are connected to an MS, the MS typically acts as the destination host device, performing proxy-type "middlebox" services including address translation and message routing for each connected mobile terminal ingress messages. Depending upon the mobile terminal, the MS also may transcode and convert the data into the desired mobile terminal device format. As noted above, this additional processing can be deleterious to the overall end-to-end time budget, potentially resulting in a perceptibly degraded Quality-of-Service.

The diverse mobile communication environment of terminal devices, device interface link standards, carrier access methods, telecommunication services, and Quality of Service requirements, may place great and varied demands on an MS. Thus, it is desirable to provide an MS that is capable simultaneously supporting multiple mobile terminals over multiple wireless network technologies, with a reduced impact on Quality of Service requirements.

SUMMARY

The present invention provides methods for communicating between first and second communication endpoints and for provisioning a mobile configuration, as well as dynamically provisioned mobile station embodiments. In a method for communicating between a first communication endpoint and a second communication endpoint, a mobile communication node receives a request relative to a unique network configuration from a connected network or a connected managed device. The mobile communication node dynamically provisions a mobile configuration for the connected managed device, in response to the request. The mobile communication node also adapts messages over an $R_m$ interface between network protocol signals and TE2-type signals from the connected managed device for communication with the connected managed device. In addition, the mobile communication node also adapts messages over a $U_m$ interface between network protocol signals and a selected wireless communication protocol over a selected carrier access method for communication with the connected network. The mobile communication node establishes a predetermined communication state between the managed device as the the first communication endpoint or the second communication endpoint through the communication node, in which the network configuration uniquely identifies the first communication endpoint relative to the second communication endpoint across the communication network. The adapting of the messages can be effected over one or more wired or wireless non-ISDN-compatible physical $R_m$-side interfaces communicating using asynchronous, synchronous, isochronous, or variable-rate services.

Relative to the methods for provisioning a mobile configuration, ALLOCATE, RELEASE, REVOKE, UPDATE, and MULTIPLE ALLOCATE provisioning methods are included.

In the provisioning method for allocating a mobile configuration, a mobile terminal sends a request to ALLOCATE a unique network configuration to a mobile station address server (ASVR) to which it is connected. The ASVR sends the ALLOCATE request for the unique network configuration to an available communication network and receives the configuration therefrom. The ASVR sends the unique network configuration to the mobile terminal, where it is used to configure the mobile terminal.

This provisioning method also can include the (TE2) mobile terminal sending the ALLOCATE request to a client interface which can be connected between the mobile terminal and the ASVR. The client interface then sends the request from the TE2 to the ASVR. In addition, the ASVR can select, and send the request to ALLOCATE a unique network configuration to, an available server interface, which can be connected between the ASVR and the communication network. A communication network can send the unique network configuration to the server interface, which send the configuration to the ASVR. The ASVR can send the configuration to the client interface, facilitating the configuration of the mobile terminal. Also, the ASVR can identify, and attempt to obtain, those resources, which are concordant with the TE2 request, thereby accommodating a wider range of inexpensive, or legacy TE2 mobile terminals which may be able to simply request service.

If the client interface, the server interface, or both are initially in the DOWN state, the inoperative interface can request a configuration for itself. The client interface requests the configuration from the ASVR or network; the server requests the configuration from the network. With a configuration, client or server interfaces can configure themselves and transition into the UP state. Once UP, the interfaces can issue a subsequent request to ALLOCATE a unique network configuration, to fulfill the request first made. Where an interface, such as a server interface, is configured, but is unable to obtain a resource, or configuration, to satisfy a request by a client interface for such a resource, the server interface can be adapted to pass its configuration on to the requesting client interface. In turn, the requesting client interface can use the passed-on configuration to configure an attached, requesting managed device with a unique identity on the communication networks, thereby enabling the managed device to communicate as a endpoint host on the network.

In the provisioning method for releasing a mobile configuration, a mobile terminal sends a notice to RELEASE its associated unique network configuration, to the ASVR to which it is connected. The ASVR can send the notice to the connected network, so that the unique network configuration may be used for other nodes and endpoints on the network. The mobile terminal is deconfigured after it sends the RELEASE notice. This provisioning method also can include the mobile terminal sending the RELEASE request to a client interface, which can be connected between the mobile terminal and the ASVR. The client interface can update tables in which the mobile terminal is associated with the unique network configuration and, can send a RELEASE request to the ASVR in response to the deconfiguring of the mobile terminal.

In addition, the ASVR can select, and send the request to RELEASE the unique network configuration to, an available server interface, which can connected between the ASVR and the communication network. The communication network can send a RELEASE response to the server interface, acknowledging the unique network configuration release. The server interface can send the RELEASE response to the ASVR, which, in turn, can send the RELEASE response to the client interface. If the client interface has no additional mobile terminals to release, then the client interface releases its client interface configuration to the ASVR. With a RELEASE response in acknowledgment from the ASVR, the client interface can transition to the DOWN state.

In the provisioning method for revoking a mobile configuration, a network to which an ASVR is connected can become unavailable. In response, the ASVR can send a request to REVOKE the unique network configuration of the mobile terminal. The mobile terminal is deconfigured in response to the REVOKE request. This provisioning method also can include the server interface connected between the network and the ASVR transitioning to the DISABLED state upon unavailability of the network, and notifying the ASVR of this change of state. The ASVR can identify a client interface to which the mobile terminal associated with the unique network configuration is connected, and send the REVOKE request to that client interface. The client interface can update routing tables in response to the request but, before the mobile terminal is deconfigured, the client interface may send an ALLOCATE request to the ASVR to obtain another unique network configuration from another source. If the ASVR can identify a source for another unique network configuration, it sends the ALLOCATE request to the source, and returns the new unique network configuration to the client interface, where the mobile terminal configuration is updated with the new configuration.

However, if the ASVR cannot identify a source for another unique network configuration, it sends an ALLOCATE failure notice to the client interface. Unable to obtain a valid unique network configuration for the mobile terminal, the client interface updates its routing tables to reflect the deconfiguring of the mobile terminal. The mobile terminal is deconfigured. If the client interface has no additional mobile terminals to revoke, then the client interface releases its client interface configuration to the ASVR. With a RELEASE response in acknowledgment from the ASVR, the client interface can transition to the DOWN state.

In the provisioning method for updating a mobile configuration, as in an intranet handoff, the ASVR receives a request to UPDATE the first unique network configuration, along with a substitute second unique network configuration. The ASVR sends to the mobile terminal the request to UPDATE the first unique network configuration, along with a substitute second unique network configuration. The mobile terminal is reconfigured with the second unique network configuration.

This provisioning method also can include a server interface receiving notice of a handoff, along with the second unique network configuration. The server interface sends an UPDATE request to the ASVR along with the second unique network configuration. After updating routing tables, the ASVR can send the UPDATE request to the client interface along with the second unique network configuration. The client interface updates its routing tables with the second unique network configuration being substituted for the first unique network configuration relative to the mobile terminal. The mobile terminal is reconfigured, substituting the second unique network configuration for the first unique network configuration. The client interface acknowledges the mobile terminal configuration by sending an UPDATE response to the ASVR, which sends an UPDATE response to the server interface.

In the provisioning method for allocating a mobile configuration for multiple terminals, carrier access methods, or both, one of two or more mobile terminals can send a notice to the ASVR to which it is connected to ALLOCATE an associated unique network configuration. The respective ALLOCATE request is sent from the ASVR to a selected available communication network using a selected wireless communication protocol over a selected carrier access method. Each selected network, protocol, and access method is selected from a plurality of available communication networks, a plurality of a wireless communication protocols and a plurality of carrier access methods. The ASVR receives from the selected available communication network the unique network configuration for the mobile terminals. The ASVR sends the unique network configuration to the mobile terminals, which is configured the unique network configuration. These operations can be repeated for each mobile terminal requesting that a unique network configuration be allocated for the mobile terminal.

With respect to dynamically provisioned mobile station embodiments, a mobile station is provided for communicating with a mobile service provider across a $U_m$ interface, which includes a mobile terminal coupled to, and configured to communicate messages across, an $R_m$ interface, using a selected configuration; and a wireless communication device coupled between the $R_m$ interface and the $U_m$ interface. The wireless communication device provides the selected configuration to the mobile terminal, and cooperates with the mobile terminal to configure it to communicate messages across the $R_m$ interface. The wireless communication device is adapted to communicate the messages across the $U_m$ interface with the mobile service provider. Multiple terminals may be coupled to and configured to communicate messages across, the $R_m$ interface using a respective selected configuration provided to the respective terminal by the wireless device. The wireless communication device also can be adapted to communicate with multiple mobile service providers across respective $U_m$ interfaces, in which a selected mobile terminal can communicate with a selected mobile service provider across a respective one of the $U_m$ interfaces. The carrier access method can be a CDMA carrier access method, a TDMA carrier access method, a FDMA carrier access method, or an operable combination thereof. In addition, the carrier access method can be defined by International Telecommunications Union (Radio) Recommendation ITU-R M.1457.

The mobile station can include a managed device and a mobile station manager communicating with a communication network over the wireless communication link. The managed device has a selected network configuration and communicates messages to the mobile station manager with TE2-type physical layer signals. The mobile station manager is coupled between the managed device and the wireless link, and is adapted to render the TE2-type signals suitable for communicating with the communication network across the wireless link. The mobile station manager can be adapted to communicate across multiple $U_m$ interfaces, which can represent multiple carrier access methods, including a digital carrier access method, an analog carrier access method, and an operable combination thereof. One or more of the carrier access methods can be defined by International Telecommunications Union (Radio) Recommendation ITU-R M.1457.

The mobile station manager can include a device-related interface, a network protocol, and a mobile configuration manager. The device-related interface is connected with a managed device and is adapted to transform the messages of TE2-type physical layer signals into messages conforming to a network protocol. The network protocol interface is connected with the wireless link, and is adapted to transform the messages conforming to the network protocol into messages suitable for communicating with the communication network over the wireless link. The mobile configuration manager is adapted to manage a connected managed device, and to communicate the messages conforming to the network protocol between the device-related interface and the network protocol interface. The managed device can be a non-ISDN-compatible mobile terminal.

Also, the managed device may exchange messages through one or more $R_m$ interfaces, each using TE2-type physical layer signals conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selected combination thereof. Furthermore, messages can be exchanged through one or more $U_m$ interfaces, each using one of a digital carrier access method, an analog carrier access method, and an operable combination thereof. Carrier access methods can include a CDMA carrier access method, a TDMA carrier access method, a FDMA carrier access method, or an operable combination thereof. One or more of the carrier access methods can be defined by ITU-R M.1457. The mobile configuration manager can selectably effect message exchange with multiple managed devices, with multiple communication networks, or both. In response to a Quality-of-Service signal, the mobile communication manager can select a mobile terminal, a communication network, or both, through which messages are exchanged.

A portable communication adaptor is provided, which couples a TE2 communication terminal with a communication network, allowing the TE2 communication terminal to exchange messages with a remote host over the communication network. The adaptor includes a first interface coupled with the TE2 communication terminal; a second interface coupled with the communication network; and an address server linked to the first interface and the second interfaces. The address server cooperates with the second interface to exchange the messages with the communication network. Also, the address server acts on a unique resource to the TE2 communication terminal, and cooperates with the first interface to configure the TE2 communication terminal with the unique resource. Moreover, the address server cooperates with the first interface to compel the TE2 communication terminal to respond as a local host relative to the remote host. Thus, the address server cooperates with the first interface to to exchange messages with the TE2 communication terminal, and causing the portable communication adaptor to respond substantially as a communication router. The address server acts on the unique resource by transmitting a provisioning signal to one or both of the first and the second interfaces. These provisioning signals can include one or more of an ALLOCATE provisioning signal, a RELEASE provisioning signal, a REVOKE provisioning signal, an UPDATE provisioning signal, or a selected combination thereof.

In addition, the portable communication adaptor can exchange messages through one or more $R_m$ interfaces, each interface using a TE2-type physical layer signal format conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selected combination thereof. Furthermore, messages can be exchanged through one or more $U_m$ interfaces, each using one of a digital carrier access method, an analog carrier access method, and an operable combination thereof. Carrier access methods can include a CDMA carrier access method, a TDMA carrier access method, a FDMA carrier access method, or an operable combination thereof. One or more of the carrier access methods can be defined by ITU-R M.1457. The portable communication adaptor can selectably effect message exchange with multiple managed devices, with multiple communication networks, or both. In response to a Quality-of-Service signal, the portable communication adaptor can select a mobile terminal, a communication network, or both, through which messages are exchanged.

BRIEF DESCRIPTION OF THE DRAWINGS

The present invention will be more fully understood from the following detailed description of the embodiments thereof, taken together with the following drawings, wherein.

DETAILED DESCRIPTION OF THE EMBODIMENTS

The embodiments herein provide a mobile station manager, a mobile station, and a communication system that allow a user to access telecommunication provider services and communicate messages, with different wireless communication protocols and carrier access methods, using mobile terminal devices that may not be ISDN-compatible. As used herein, the term "provisioning" corresponds to the acts of performing a selected function for the purpose of configuration, resource management, Quality-of-Service selection, fault and event response, or a combination thereof. Provisioning also may include additional features, such as implementation of policies affecting mobile terminal device rank and priority, communication security and authentication, and other procedures which may be advantageous to implement using mobile station.

By provisioning resources, including configurations, for one or more attached mobile terminal devices, the access to services provided by embodied versatile multimode mobile stations and methods therefor can provide substantial end-to-end connectivity, and beneficially may allow users to access telecommunication services within the scope of agreed QoS parameters. Non-limiting examples of the services and content enabled by the embodiments herein include real-time conversational voice, interactive streaming video, streaming audio, and interactive streaming multimedia; real-time or near-real-time sensed or provider-pushed telematics, medical, security, and location services; mail (text/voice/video), bulk-transferred multimedia and data; messaging(IM/SMS/EMS/MMS) services; and other third-party services amenable for telecommunication, including those described in ITU-T Recommendation I.210, "Principles Of Telecommunication Services Supported By An ISDN And The Means To Describe Them," International Telecommunication Union, March 1993, as amended.

Figure 1:
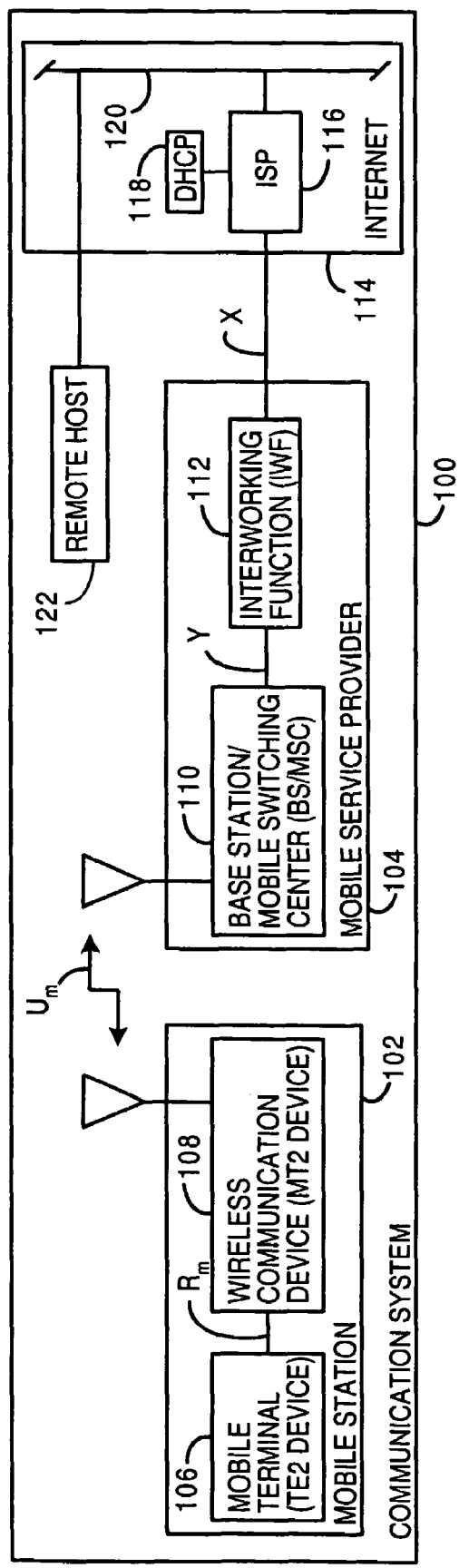
FIG. 1 is a simplified block diagram of a mobile wireless communication system.

FIG. 1 illustrates simplified communication system 100 in which a user operating a first communication endpoint, represented by mobile terminal 106 can interact with a second communication endpoint/host 122 over network 114. MS 102 connects at least one mobile terminal 106 to wireless communication device 108. Frequently, wireless communication device 108 is configured to communicate with MSP 104 as an ISDN-compatible device, while mobile terminal 106 is configured as a non-ISDN-compatible data terminal, i.e., a Terminal Equipment type-2 (TE2) device. Wireless communication device 108 can be a Mobile Terminal type-0 (MT0) device, which does not support an external interface; a Mobile Terminal type-1 (MT1) device, which provides an ISDN-compatible user-network interface; or a Mobile Terminal type-2 (MT2) device, which provides an non-ISDN-compatible user-network interface.

Generally, communication endpoints that are TE2 equipment, such as MS 106, can include telephones, facsimiles, displays, computers, intelligent printers, personal digital assistants, pagers, as well as many other devices, which may communicate with MT2 wireless communication device 108 using one or more asynchronous, synchronous, isochronous, or variable-rate services, over wired or wireless non-ISDN-compatible physical $R_m$-side interface. Such physical interfaces may comply with ITU-T V- and X-series Recommendations, for example, ITU-T Recs. V.35 and X.31, as well as EIA/TIA Standards such as RS-530, RS-485, RS-449, RS-422/423, and EIA/TIA RS-232 (ITU-T Rec. V.24). Furthermore, embodiments herein are capable, without limitation, of interoperating with interfaces compliant at least in part with the family IEEE-802® Standards for Local and Metropolitan Area Networks (including fixed and wireless access), and IEEE-1394 (High Performance Serial Bus); as well as other non-ISDN-compatible interfaces, including USB, PCI/PCI-X, PC Card, ISA, EISA, and Bluetooth®. Indeed, MS 106 can be representative of the mobile terminals, managed devices, TE2 communication terminals, and other ISDN-incompatible devices described herein, which typically communicate messages with wireless communication device 108 using TE2-type physical layer signal formats conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selected combination thereof On the other hand, MS 106 may be representative of a terminal device that does communicate messages using ISDN-compatible signals having formats described, at least in part, in the relevant ITU-T I- and Q-series Recommendations. These devices, TE1 devices, can be the functional equivalent of a TE2 device combined with the equivalent of a TA. Although a TE1 device typically can exchange messages in ISDN-compatible format, device 108 may be employed therewith to provide selected desired function. In either case, it is desirable that selected communication endpoints illustrated with respect to mobile stations, mobile configuration managers, and portable communication adaptors herein, be configured with an unique resource, such as a network configuration, to facilitate being identified as a host device on the communication network. It is desirable that the selected communication endpoints be uniquely identified as a host on the communication network with which it is coupled.

Conveniently, Mobile Terminal type-2 (MT2) wireless communication device 108 can convert the communication (i.e., signaling and data) transmitted over the $R_m$ interface between managed TE2 device 106 and MT2 108 into an ISDN-compatible format. Typically, a TE2 device employs a terminal adaptor (TA) to access an ISDN-compatible system. Among the functionalities that may be provided by a TA are: physical interface functions; protocol handling and conversion; communication rate adaption, message flow control, and channel capacity negotiation; mapping of signaling information and procedures; synchronization and messages alignment; and operational status and maintenance functions. Physical interface functions can include the mechanical, electrical, electromagnetic, and optical characteristics of the interconnections and interactions between the devices connected by the interface. It is desirable that MT2 device 108 to the extent it is representative of the inventive embodiments, provide at least some of the desired physical and logical signal transformations.

Also typically, each active mobile TE2 terminal 106 is coupled with MT2 device 108 via an operable network interface configured with an assigned IP configuration, which includes, for example, IP address, gateway address, DNS addresses, subnet mask, and so forth. The IP configuration could be assigned statically or be obtained dynamically by the network interface. With a valid network configuration, an interface is enabled to transport IP traffic over the network, in addition to transforming the signals crossing the $R_m$ interface into the native signal format of the communication endpoint, such as mobile terminal 106.

MS 102 and MSP 104 communicate as constituents of a wireless access network telecommunication provider service across the $U_m$ air interface using a wireless communication protocol. As used herein, an MS is a station, fixed or mobile, which serves as the end user's wireless communication link with a base station. MS 102 can be a stand-alone portable unit (e.g., hand-held terminal), a vehicle-based unit, or a fixed-location MS. MS 102 may be incorporated into a self-contained data device such as a personal digital assistant (PDA); connected to a computing device such as a laptop computer; or coupled to others of a vast array of electronic terminal equipment providing paging, text, voice, data, and video functions. Depending upon the service requested by the user, it may be desirable to use a bidirectional wireless communication protocol to transmit between MT2 device 108 and Base Station/Mobile Switching Center (BS/MSC) 110. Advantageously, MS 102 can be configured to communicate contemporaneously using one or more TE2 devices, over the $R_m$ interface, and with one or more wireless networks across the $U_m$ interface employing different carrier access methods. Conveniently, MS 102 can facilitate such communication, for example, by creating interfaces based on common network protocol, such as an IP network protocol. BS/MSC 110 in FIG. 1 can be representative of a network of mobile switching centers, with each MSC using multiple base transceiver stations to communicate with the subscribers to the services of MSP 104.

In certain implementations, the communication format of BS/MSC 110 across logical interface Y may not be compatible with the message format used by ISP 116 to communicate with the appropriate layers of global network 120. In such a case, it is desirable that Interworking Function (IWF) 112 adapts the communication format transmitted across interface Y into the communication format used by ISP 116 across logical interface X, typically at the Network Layer level. Network interworking functions provided by IWF 112 typically are directed to adapting network characteristics at interface X of MSP 104 and communication network 114, to facilitate communication flow between core network 120 and BS/MSC 110. Interworking functions can include physical and electrical interface conversions; bit rate, transfer mode, switching mode and signaling conversions; protocol conversions and mapping; special routing, address translation, and so on.

The embodiments herein provide that a unique configuration, such as a unique IP address, be obtained for, and assigned to, each of the aforementioned communication endpoints represented by terminal 106, thereby facilitating end-to-end connectivity across public network 114 or, if appropriate, a private service network (which also may be represented by network 114). If terminal 106 is capable of being passed the configuration and configuring itself, then wireless device 108 provides this degree of service. On the other hand, if wireless device 108 can facilitate the operation of terminal 106 by performing the configuration and providing additional management and configuration services, then wireless device 108 can adapt to provide additional levels of supervisor-type service.

According to the embodiments presented herein, a privately- or globally-unique network configuration can be allocated for, and assigned to, each selected TE2 106, such that it becomes a uniquely-identified, network-connected mobile host. In this manner, the selected TE2 106 can act as a managed host, and MT2 108 can serve as the mobile configuration manager and message router for the managed host. In general, MT2 108 requests a network configuration server, such as DHCP server 118, to allocate and assign a unique configuration to host TE2 106. Once received from the configuration server, MT2 108 configures host TE2 106 with the allocated configuration. In the situation where MT2 108, itself, initially is not configured to communicate with configuration server 118, MT2 108 can be adapted to: (1) request a unique configuration from DHCP server 118, (2) configure itself with the unique configuration, and (3) connect itself to core network 120, prior to performing the aforementioned request-and-configure host management service for host TE2 106. Although BS/MSC 110, or IWF 112, also could provide, individually or together, host configuration management services, it is advantageous that such host configuration management services be provided by MT2 108. Of course, DHCP is but one of the configuration server mechanism that may be employed to provision a unique host configuration for terminal device 106.

Figure 2:
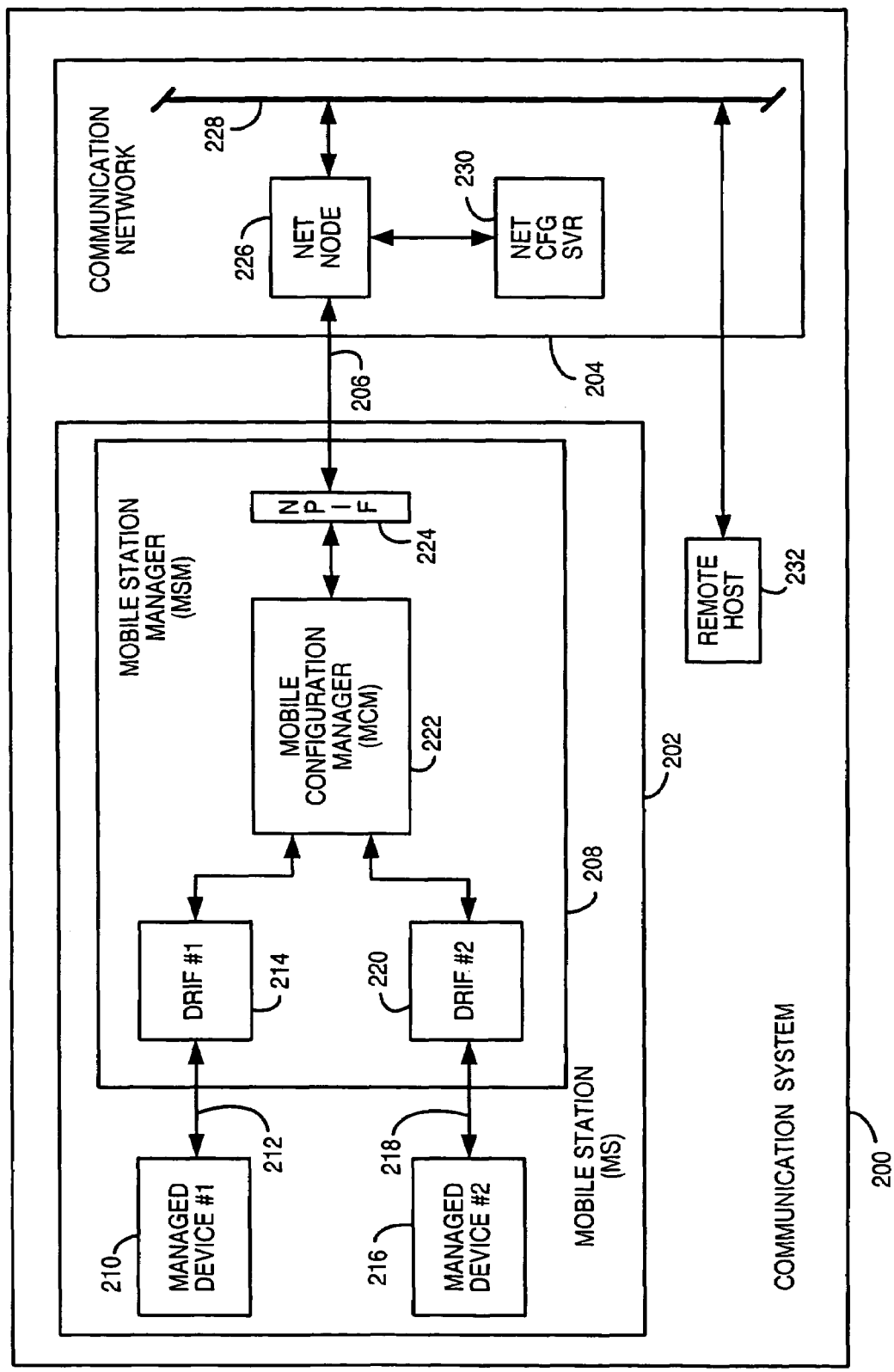
FIG. 2 is a block diagram of one wireless communication system having an embodiment of an MS managing multiple TE2 hosts.

FIG. 2 illustrates communication system 200, in which MS 202 can have at least one managed device 210, 216 coupled as a host, across communication link 206, to communication network 204. Conveniently, multimode MS 202 can simultaneously support multiple mobile terminals, e.g., managed devices 210, 216, over multiple wireless network technologies, accessing a supported wireless network whenever MS 202 enters the coverage area of a wireless network, such as network 204.

Remote host 232 also can be coupled to core network 228 and can bidirectionally communicate messages to either, or both, of managed device 210 and managed device 216. Remote host 232 is not required to be a mobile or wireless host, and can be coupled to core network 228 by any available communications medium. Moreover, remote host 232 can be any class or type of entity capable of being a host, whether a telecommunication provider service, functional service, router, or individual communicant device. When connected as peer hosts, host managed devices 210, 216 can serve as a first communication endpoint, and correspondent remote host 232 can serve as a second communication endpoint.

In general, managed host devices 210, 216 communicate with MSM 208 using respective physical layer level signals 212, 218, whose characteristics may be analog or, if digital, are not ISDN-compatible digital signals. Accordingly, it is desirable that MSM 208 use device-related interface modules (DRIF) 214, 220 to adapt to an ISDN-compatible format, signal 212 from managed device 210, and signal 218 from managed device 216. It also is desirable that MSM 208 be adapted for multimode operation, i.e., be able to transfer data over any type of accessible network technology, and to effect data session handoffs as transparently as possible while moving from one coverage area to another.

It further is desirable to employ a configuration management and provisioning module that can exercise control over the way in which messages are routed through MS 208, decreasing delays which might otherwise develop from queueing, translating, and processing messages intended for, or received from, managed devices 210, 216, such as, through Network Address Translation techniques. Advantageously, Mobile Configuration Manager (MCM) 222 can include the functions of such a configuration and management module. In general, DRIF module #1 214 and DRIF module #2 220 can be representative of $R_m$ interfaces that MCM 222 can use to exchange control signals and messages with respective communication endpoint managed devices 210, 216.

In addition, MCM 222 exchanges control signals and messages with Network Protocol Interface (NPIF) module 224, which can adapt the communication flowing therethrough to be compatible for transmission across communication link 206. As described with reference to FIG. 1, link 206 can be established across the physical $U_m$ air interface that is typically encountered with wireless communication links. As used herein, network node 226 illustrates a simplified, composite function, which, for clarity, may combine the functions ascribed to BS/MSC 110, IWF 112, and network node 116. Network node 226 can accommodate both the communication flowing across communication link 206, as well as across core network 228 and, thus, provides wireless communication transmission/reception, signal conversion and formatting, and interworking functions. The principles embodied herein can apply whether communication network 204 is a local service provider network delivering selected network-specific telecommunication provider services, or is part of a larger internetwork of service providers, including the Internet.

Relative to other hosts and communication endpoints, which may be connected to network 204, network configuration server 230 can allocate and deliver configuration information unique to network 204. For example, configuration server 230 may have allocated and delivered unique configuration information to remote host 232, so that remote host 232 has a unique configuration for internetworking on core network 228.

In an exemplary use, in which a user of MS 202 desires to communicate with remote host 232, using managed device #1 210, the user connects managed device #1 210 to MSM 208 by transmitting signal 212 to DRIF module #1 214. DRIF module #1 214 performs the desired physical and logical transformations on signal 212 for use by MCM 222 and requests a network configuration from MCM 222. MCM 222 can connect with communication network 204 by activating link 206, and by requesting the network configuration from network node 226. If MCM 222. does not yet have a configuration that is unique on core network 228, MSM 222 can initially request that network configuration server 230 allocate and return such a configuration. Configuration server 230 can receive the request of MCM 222 and, in response, can allocate and transmit a unique configuration to MCM 222 via network node 226 and link 206. MCM 222 then can use the unique network configuration received from server 230 to establish a unique identity on core network 228. MCM 222 then can request that network configuration server 230 allocate and return to MCM 222 another unique network configuration, which is allocated for managed device #1 210. Once the unique configuration is received from configuration server 230, MCM 222 uses the second unique configuration to configure and manage managed device #1 210, as a host with a unique identity, e.g., a unique IP address, on core network 228.

Should the user wish to employ managed device #2 216 to contact remote host 232, or another remote host (not shown), MCM 222 repeats the request to network configuration server 230, on behalf of managed device #2 216, for a unique configuration. When received, MCM 222 configures and supervises managed device #2 216, as a second connected host with a unique identity on core network 228, e.g., a unique IP address. Thus, MS 202, having MSM 208 according to embodiments herein, is capable of configuring and managing one or more managed TE2 devices as internetworked hosts, each with a configuration that is globally unique to core network 228, e.g., the Internet. Although MCM 222 may provide management services to managed devices 210, 216 which may be attached to MSM 208, it is desirable that MCM 222 routes messages substantially directly to the connected host that is identified by the unique configuration in the messages. As MS 202 roams within the geographic region served by the service provider, MCM 222 also may coordinate the preservation of communication link 206 with network node 226, and similar nodes of the service provider.

Figure 3:
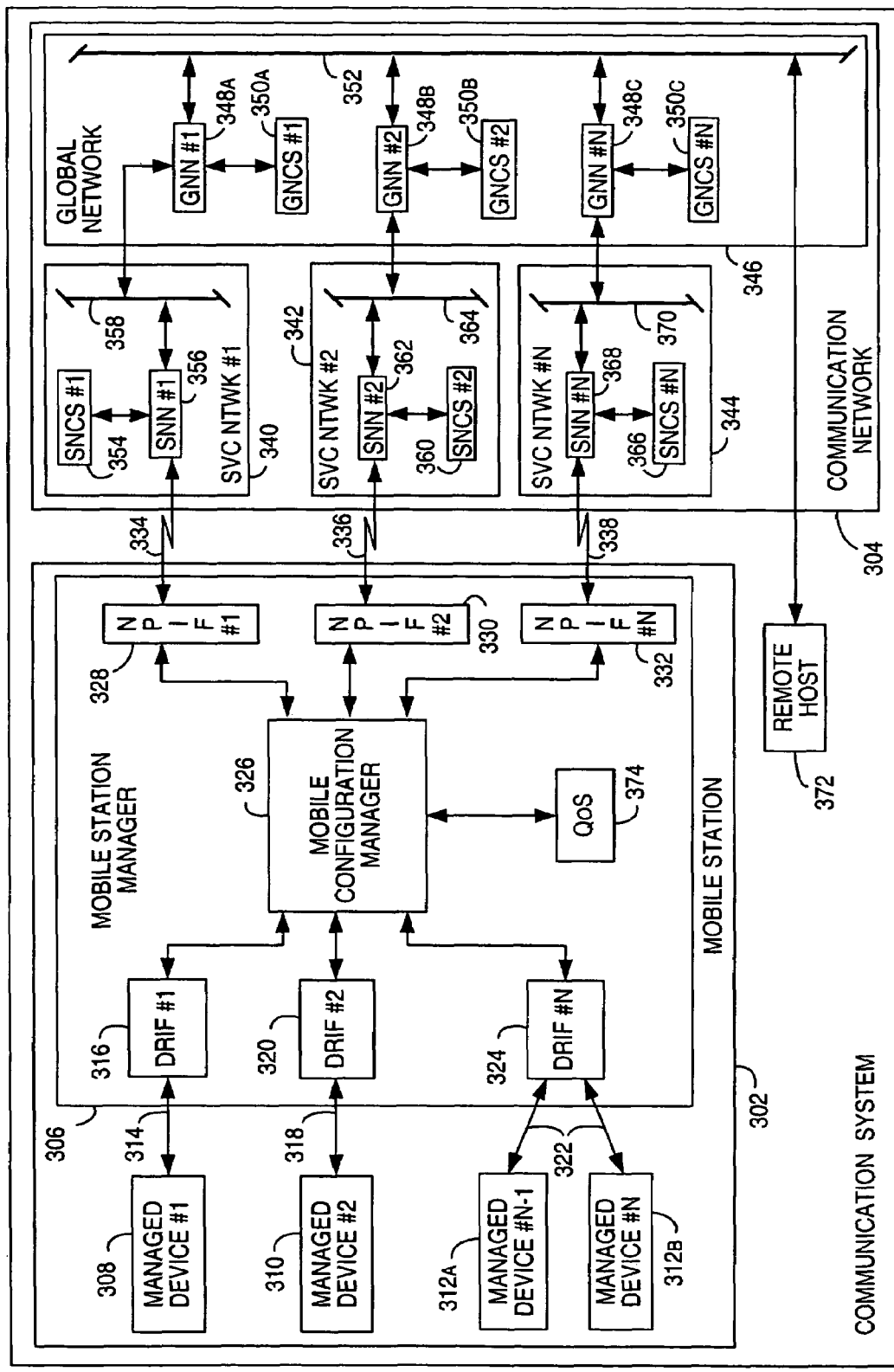
FIG. 3 is a block diagram of another wireless communication system having another embodiment of an MS managing multiple TE2 hosts in a multimode operating environment.

Communication system 300 in FIG. 3 illustrates an exemplary multimode MS 302, which includes MCM 326. MCM 326 can be adapted to manage more than one TE2 device, such as managed device #1 308, managed device #2 310, and managed devices #(N−1) 312a and #N 312b. The physical and logical device characteristics of communication endpoint devices 308, 310, and 312a, 312b may conform to different standards, specifications, or recommendations such that the characteristics of signals 314, 318 and 322 communicated to MSM 306 can be distinct from each other.

For example, managed device #1 308 may be a Group 3 facsimile, conforming to ITU-T V-series recommendations such as V.17, V.21, V.27ter, and V.29; managed device #2 310 may be a portable analog call AMPS (IS-41) cellular system handset; and managed devices #(N−1) 312a and #N 312b may be constituents of a wireless local area network that is operably coupled to MSM 306 via wireless signal 322. Thus, it is desirable to use device-related interface modules, such as DRIF module #1 316, DRIF module #2 320, and DRIF module #3 324, to perform the desired physical and logical transformations on signals 314, 318 and 322, and to facilitate communications between MCM 326 and devices 308, 310, and 312a, 312b.

In addition to being adapted for multiple TE2 devices on the $R_m$ side, MSM 306 can be adapted to be a multimode mobile station capable of communicating using multiple carrier access methods on the $U_m$ side, including one or more broadband wireless network technologies such as IMTS-2000, SDR, CDMA, UMTS, GSM, GPRS, 802.11, etc., over which MS 302 can connect to both private and public networks, including the Internet. Beneficially, MSM 306 can create and enable a NPIF for each network, which uses a particular carrier access method, as well as an interface for each instance of a particular network. Such interfaces are exemplified by NPIF 328, 330, 332. Each NPIF can provide access to either a public IP network, or a private IP network, for the connected communication endpoints, represented by TE2 devices 308, 310, 312a, 312b.

On the $R_m$ side, it is desirable that MSM 306 communicate with each connected TE2 devices 308, 310, 312a, 312b, by creating and enabling a DRIF on $R_m$, such as an IP interface. MSM 306 can connect with multiple TE2 devices 308, 310, 312a, 312b using well-known data link layer access methods like LAN (e.g., IEEE Std. 802.3); WLAN (e.g., IEEE Std. 802.11b); WPAN (e.g., BLUETOOTH™ 2.4 GHz PAN, or IEEE Std. 802.15); dial up over serial bus (PPP over USB or UART); or a combination thereof. BLUETOOTH is a trademark of Bluetooth SIG, Inc. Each TE2 device 308, 310, 312a, 312b can be capable of gaining access to an IP data network using DRIF 316, 320, 324 and, depending upon the access method used, each DRIF module may support one or more TE2 devices. In addition, it is desirable that an IP network interface be positioned below the IP routing layer in the data protocol stack, for example, to provide access to, and to transport IP messages over, an IP-based network.

Each of service networks 340, 342, 344, interoperating with MS 302, can employ a different carrier access method, or media technology, to communicate with MS 302. For example, service network #1 340 may operate as a cdma2000-type of service network, service network #2 may operate as a satellite link service network, and service network #N 344 may operate as a Short Messaging Service system.

Conveniently, it is desirable to connect with MCM 326 more than one NPIF module, each adapted to accommodate a desired mode of service over the physical $U_m$ air interface encountered with wireless communication links, as described with reference to FIG. 1. In general, NPIF modules 328, 330, 332 adapt the communication flowing therethrough to be compatible for transmission across communication links 334, 336, 338, for example, and to permit remote host 372 to communicate with the appropriate mobile host(s) represented by managed devices 308, 310, 312a, 312b. Furthermore, some or all of the Quality of Service parameters may be selectable in QoS manager 374, relative to the type of communication, the carrier access method for a particular operation, the terms of the user service agreement, or a combination thereof. It may be desirable to configure QoS manager 374 to select, for example, a premium quality carrier access method over a standard quality carrier access method to provide a multimedia managed device host, e.g., TE2 device 308, with high-fidelity services over a high-bandwidth, low-error link, e.g., link 336.

It is contemplated that MCM 326 can be configured to connect contemporaneously more than one managed device 308, 310, 312a, 312b, to more than one service network 340, 342, 344. Thus, MCM 326 may manage more than one DRIF module Advantageously, the architecture of MSM 306 can be substantially modular, in which device-related interfaces, network protocol interfaces, or both, can be added, removed, exchanged, upgraded, or otherwise replaced with additional interfaces, thereby customizing the overall communications capabilities of MS 306. Such modularity can be provided by MCM 326 in hardware, software, or a combination thereof, to accommodate an array of managed device interfaces, and as well as available carrier access methods. Moreover, the particular devices 308, 310, 312a, 312b, interface 316, 320, 324, 328, 330, 332, or carrier access methods (i.e., over links 334, 336, 338) contemplated for use during a particular communication, may be selectable by the user of MS 302, or may be activated remotely by a communication stream incoming to a specific managed device 308, 310, 312a, 312b, inducing it to become configured as a mobile host.

In an exemplary use of communication system 300, in which MS 302 is employed, NPIF #1 328 may be a cdma2000-1xEVDO transceiver providing Voice-over-IP (VoIP) service over RF link 334 to cdma2000-based service network #1 340. Similarly, NPIF #2 330 may be an SDR transceiver operating in a GSM/GPRS mode to provide Internet data access over RF link 336 with GSM/GPRS service network 342. Also, NPIF #3 332 may be a S-UMTS/IMT-2000 transceiver for providing location-specific interactive multimedia presentations from an UMTS/IMT-2000 network over LEO satellite link 338 and a concurrent GPS service. In this example, each of service networks 340, 342, 344 is connected with global network 346, thereby facilitating connectivity between remote host 372, and desired managed devices 308, 310, 312a, 312b.

As used herein, service network node #1 340, service network node #2 342, and service network node #3 344, each illustrate a simplified, composite function, which can combine the functions similar to those indicated by BS/MSC 110, IWF 112, and node 116 in FIG. 1 and, thus, are provided for simplicity. Service network nodes 340, 342, and 344 can accommodate both the communication flowing across respective communication links 334, 336, 338, as well as across core network 352 and, thus, provides the appropriate wireless communication transmission/reception, IWF functions, and so forth. As stated previously, it may be desirable that a network resource, such as a globally-unique configuration, including an address, be allocated and assigned to each host engaged in communication with a remote host across core network 352. Accordingly, MCM 326 requests one of network configuration servers 348a-c to allocate and return a unique configuration for each intended host device. After the configuration is received for a particular host, MCM 326 configures the appropriate managed device 308, 310, 312a, 312b that is intended to act as a mobile host. Using the end-to-end connectivity afforded by the globally-unique configuration (e.g., IP address), the mobile host thus configured is connected to remote host 372. In the context of the previous example, managed device #(N−1) 312a can be a voice handset and device #N 312b can be a Group 3 facsimile, both of which can be coupled by local wireless personal area network (WPAN) local link 322 to DRIF #N 324. In an example where the user of devices 312a, 312b desires to speak with, and receive a facsimile from, a user at remote host 372 linked to global network 346, DRIF #N 324 can be activated across WPAN link 322, and can initiate a request to MCM 326 for a globally-unique configuration for each device 312a, 312b. In this example, the user desires to communicate using a cdma2000 service, as may be provided by service network #1 340 over link 334.

If it does not yet have a globally-unique configuration, MCM 326 can issue a request that such configuration information be allocated and returned by global network configuration server (GNCS) #1 350a. Once allocated, the configuration is returned via GNN 348a to simplified SNN #1 356. SNN #1 356 transmits the configuration for MCM 326 over cdma2000 link 334, where it is converted into the appropriate form and format for use by MCM 326. MCM 326 can use this configuration to uniquely identify itself on global core network 352. MCM 326 can request a unique configuration for the handset represented by managed device #(N−1) 312a and for the facsimile represented by managed device #(N) 312b. Via NPIF #1 328, the requests from MCM 326 are uplinked over link 334 to SNN #1 356 and, transmitted to GNCS #1 350a. In response, GNCS #1 350a allocates and transmits a unique configuration for managed devices 312a, 312b to MCM 326 via SNN #1 356 and link 334.

MCM 326 can configure managed devices 312a, 312b with the received configuration information so that managed devices 312a, 312b have unique host identities established on global core network 352. The request-and-configuration sequence for each managed device 312a, 312b may occur serially or contemporaneously. As the user, operating host devices 312a, 312b, communicates with remote host 354, MCM 326 can manage the operations of host devices 312a, 312b, as well as serve as a router. As MS 302 roams within the geographic region served by the service provider, MCM 326 also may coordinate with service network #1 340, and similar nodes of the service provider, to preserve communication link 334. MCM 326 can monitor the integrity of link 334, as well as other established communication parameters, and can terminate the link by revoking the unique configuration, either by itself (e.g., using signal strength, or sensed location), or in response to control information received from the service network, e.g., service network #1 340. Although MCM 326 can request and obtain a global configuration from, for example, GNCS #1 350a, such information also may be provided by other global network configuration servers, e.g., GNCS #2 350b and GNCS #N 350c. In some circumstances, SNCS #1 354, SNCS #2 360, and SNCS #3 366, may be allocated a block of globally-unique configurations for use with respective service networks 340, 342, 344. MCM 326 can request configuration information from the appropriate SNCS #1 354, SNCS #2 356, SNCS #3 358, and configure selected managed device(s) 308, 310, 312a, 312b, without having to incur delays which may develop while accessing global network 346 through the respective service subnetworks 358, 364, 370.

Advantageously, MSM 306 may bring about improvements in actual and perceived Quality of Service by reducing latency and sensed delay, thereby increasing a user's overall satisfaction with the services provided. By employing MCM 326 to provision each attached, active TE2 mobile terminals 308, 310, 312a, 312b with a respective network resource, such as unique IP address, MSM 306 routes messages between end hosts 308, 310, 312a, 312b, and service network SNN #1 340, SNN #2 342, SNN #3 344. By minimizing middlebox-type activities such as queueing, address translation, and message forwarding, the associated penalties, which may be substantial, can be reduced with a gain of end-to-end transparency, from the vantage of the host devices.

Figure 4:
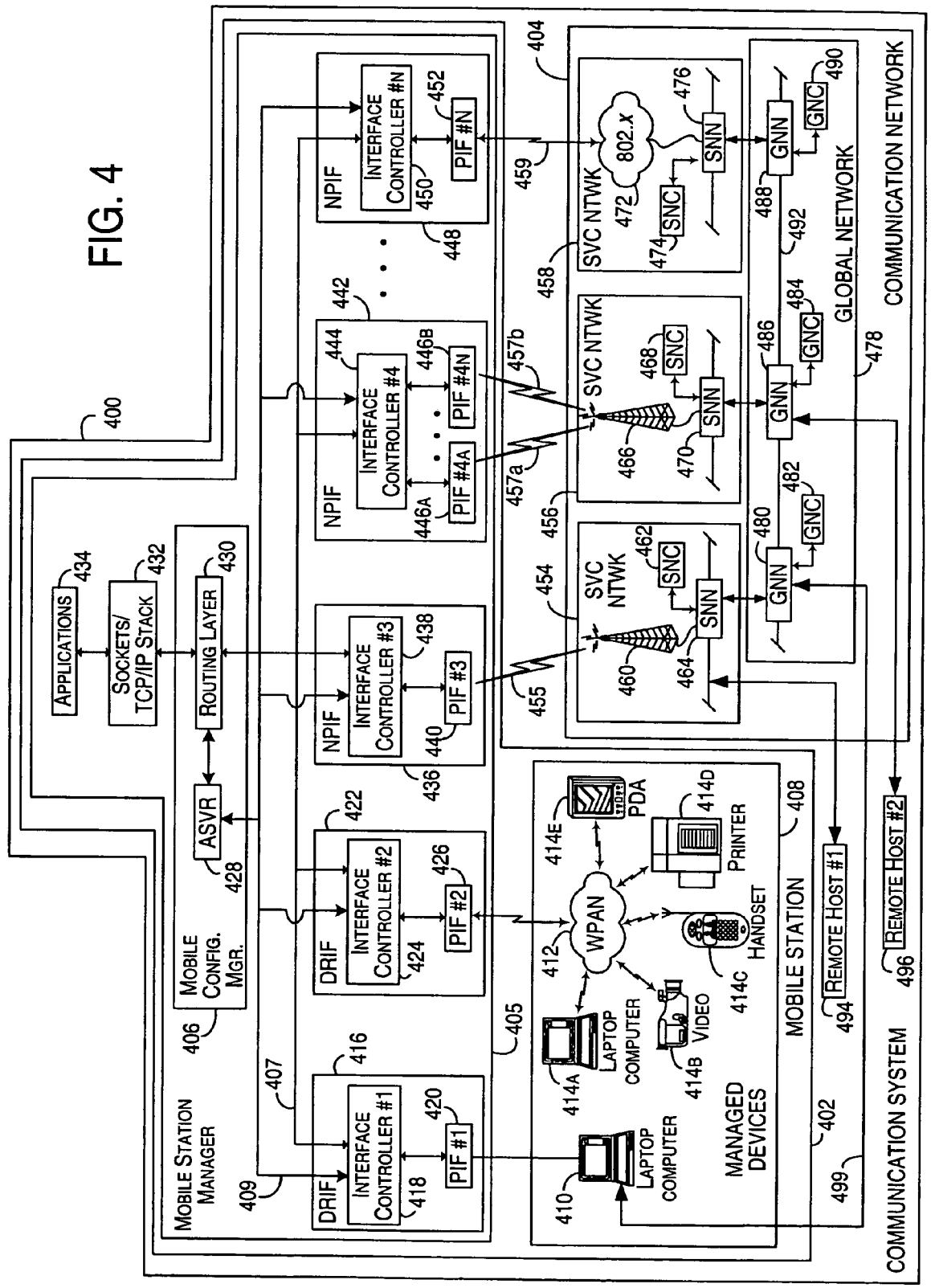
FIG. 4 is a block diagram of another wireless communication system having yet another embodiment of an MS managing multiple TE2 hosts in a multimode operating environment.

FIG. 4 depicts yet another embodiment, this time of communication system 400, in which one or more of managed devices 408 in MS 402 are capable of being connected with global core network 492, through service networks 454, 456, 458, for the purpose of communicating with at least one of the remote hosts 494, 496. Managed devices typically are TE2 devices, which can include, for example, laptop computers 410, 414a, video camera 414b, handset 414c, printer 414d, and personal digital assistant (PDA) 414e, as well as any other device that is amenable to exchanging signals with MSM 405. PIF 420, 426 can provide selected TA functionalities alone, or in combination with interface controllers 418, 424, such that managed TE2 devices 408 become substantially ISDN-compatible.

MSM 405 can be illustrative of a portable communication adaptor, which couples TE2-type communication terminals, such as one or more of managed devices 408, with one or more communication networks, such as service networks SNN 454, 456, 458, and global network 478. So coupled, respective managed devices 408 caa exchange messages with remote host 494, 496 over communication network 454, 456, 458, 476. If configured as an adaptor, MSM 405 includes first interface 416, 422 coupled with a TE2 communication terminal (such as terminal 410, 414A-E of managed devices 408); and second interface 436, 442, 448 coupled with the communication network, such as service networks SNN 454, 456, 458. The adaptor can incorporate an address server, such as ASVR 428, alone or in combination with routing layer functions 430, which adaptor 405 is linked by provisioning signal line 409 to first interface 416, 422, and the second interface 436, 442, 448. Address server 428 cooperates with the second interface 436, 442, 448 to exchange the messages with the communication network 454, 456, 458. Also, address server 428 cooperates with first interface 416, 418 to act on a unique resource for TE2 communication terminal 410, 414A-E. ASVR 428 also cooperates with the first interface 416, 418 to configure TE2 communication terminal 410, 414A-E with the unique resource. So configured, ASVR 428 cooperates with first interface 416, 418 to compel TE2 communication terminal 410, 414A-E to respond as a local host relative to remote host 494, 496. Thus, ASVR 428 cooperates with first interface 416, 418 to exchange messages with TE2 communication terminal 410, 414A-E, and to cause the portable communication adaptor 405 to respond substantially as a communication router. ASVR 428 acts on the unique resource by transmitting a provisioning signal over signal line 409 to one or both of first 416, 418, and second interfaces 436, 442, 448. These provisioning signals can include one or more of an ALLOCATE provisioning signal, a RELEASE provisioning signal, a REVOKE provisioning signal, an UPDATE provisioning signal, or a selected combination thereof.

In addition, portable communication adaptor 405 can exchange messages through one or more $R_m$ interfaces, each interface 416, 418 using a TE2-type physical layer signal format conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selected combination thereof. Furthermore, messages can be exchanged through one or more $U_m$ interfaces 455, 457a, 457b, 459, each using one of a digital carrier access method, an analog carrier access method, and an operable combination thereof. Carrier access methods can include a CDMA carrier access method, a TDMA carrier access method, a FDMA carrier access method, or an operable combination thereof. One or more of the carrier access methods can be defined by ITU-R M.1457. Portable communication adaptor 405 can selectably effect message exchange with multiple managed devices 408, with multiple communication networks 454, 456, 458, 476, or both. In response to a Quality-of-Service signal (not shown), which may be represented by QoS input signal 374 in FIG. 3, portable communication adaptor 405 can select a mobile terminal 410, 414A-E, a communication network 454, 456, 458, 476, or both, through which messages are exchanged. The Quality-of-Service may be selectable by the user, a service provider, or both.

FIG. 4 also can be illustrative of communication system 400, a constituent of which is MSM 405. MSM 405 can be an embodiment, which can incorporate a greater degree of functionality than the aforementioned portable communication adaptor. MSM 405 can include DRIF 416 and 422, which are connected with MCM 406. Similar to the DRIF modules 210, 216 in FIG. 2 and DRIF modules 316, 320, and 324 in FIG. 3, DRIF modules 416, 422 are generally representative of $R_m$ interfaces that MCM 406 can use to exchange control and messages signals with managed devices 408, and to perform the desired physical and logical transformations on those control and messages signals, bidirectionally, between non-ISDN-compatible and ISDN-compatible formats.

MSM 405 can also include NPIF modules 436, 442, 448, which can perform the desired physical and logical transformations on the control and messages signals being transmitted across selected communication links 455, 457a, 457b, and 459. As described with reference to FIG. 1, communication links 455, 457a, 457b, and 459 can include the physical $U_m$ air interface encountered with wireless communication links, and generally are the communication modes used by a particular service provider in a service region.

Each of DRIF modules 416 and 422, and NPIF modules 436, 442, and 448 can include an interface controller and a port interface (PIF). Interface controller #1 418 and interface controller #2 424 can serve as device interface controllers, connected with PIF #1 420 and PIF #2 426, respectively. Interface controller #3 438, interface controller #4 444, and interface controller #N 450 can serve as network interface controllers connected with PIF #3 440, PIFs #4a-4n 446a-446b, and PIF #N 452, respectively. It is desirable that MSM 405 dynamically creates a configuration for each of managed devices 408 based upon the type of service network 454, 456, 458 to which each device is connected.

As used herein, the term device interface controller describes an interface controller module that can provide access to a device, and can transport the lower layer traffic over the connection to which it is attached. Thus, a device interface controller can control the flow of messages signals across, and otherwise facilitate the operation of, an associated PIF. A network interface controller is an interface controller module that can provide access to a network, and can transport upper layer traffic over the network to which it connects. A PIF can be described as a physical access point of messages ingress/egress, having an electrical interface with predetermined operating characteristics and performing a predefined physical signal transformation and, perhaps, signal transcoding. In general, the characteristics of a PIF can be substantially related to the mode of transmission and physical characteristics of the traffic signal conveyed through the port.

DRIF 416 can employ PIF 420, which is connected with interface controller #1 418, and DRIF 422 can include PIF 426, which is connected to interface controller #2 424. Interfaces, including DRIF 416 and 422, can be adapted to provide a range of configuration management and provisioning services to managed devices 408. Managed devices 408 can be wired or wireless devices, and it is advantageous to employ a PIF responsive to the native signal formats of the managed devices. For example, if laptop computer 410 communicates with MSM 405 using an IEEE-1394 serial bus, PIF 420 can be adapted to convert IEEE-1394-type signals into a physical and logical format suitable for use by device interface controller 418. If exemplary managed devices 414*a-e* communicate with MSM 405 using WPAN 412, then PIF 426 can include a WPAN-type transceiver therein to convert between a signal format suitable for use with WPAN 412 and a signal format suitable for use by interface controller #2 424. Of course, the IEEE-1394 and WPAN signal formats are but two of the myriad of signal formats capable of being transformed by a suitable PIF such as PIF #1 420 and PIF #2 422, and, thus, a vast number of communication devices can be used in conjunction with MSM 405.

Similarly, NPIF modules 436, 442, 448, can employ PIF module #3 440 which is connected with interface controller #3 438; PIF modules #4A 446*a* and #4N 446*b*, which are connected with interface controller #4 444; and PIF module #N 448, which is connected to interface controller #N 450. To facilitate communication with service networks 454, 456, 458, it is advantageous to employ a PIF responsive to the native signal formats of the particular service network. For example, PIF #3 can be adapted for use with link 455 of service network 454, which may be a cdma2000 network; and may include a radio antenna unit tuned to communicate with BS 460. Likewise, PIF #4A 446*a* and PIF #4B 446*b* can be configured for use with the operating mode of links 457*a*, 457*b* of service network 456, and PIF #N 452, can be configured for use with the operating mode of link 459 of service network 458.

MCM 406 can be disposed between DRIF modules 416, 422, and higher-level processes, including those executing in socket layer 432 and application layer 434, and can manage the messages flowing through internal link 407 in MSM 405, using control signals 409. As denoted with respect to MCM 222 in FIG. 2, and MCM 326 in FIG. 3, it is desirable for MCM 406 in FIG. 4 to manage and to configure as a host, each one of managed devices 408 that is to communicate with remote host 494, 496, using a unique configuration. Such a unique global configuration may be obtained, for example, from global network configuration server 482, 484, 490, in a manner similar to the configuration-and-request processes described relative to FIG. 2 and FIG. 3. Address server (ASVR) 428 cooperates with interface controller #1 418, in DRIF module #1 416, and interface controller #2 424, in DRIF module #2 422, to perform the request-and configure process, as well as other management functions that can be advantageous to maintaining globally unique configurations for managed devices acting as hosts. ASVR 428 can serve as an IP address and configuration manager that allocates, assigns, releases and revokes host device configurations. ASVR 428 also can minimize contentions in configuration assignments. In general, each interface created on the MSM may be a client of ASVR 428, or a server of ASVR 428.

ASVR 428 can perform preselected interface management functions for MCM 406, for example, using four exemplary service primitives, including (1) ALLOCATE; (2) RELEASE; (3) UPDATE; and (4) REVOKE. These and other primitives may be used alone, or in combination, to perform a desired function. In an ALLOCATE request, a client of ASVR 428, such as DRIF 416, 422, requests ASVR 428 to allocate a unique network configuration, for example, via NPIF 436, 442, 448. The unique network configuration may be a private or a globally-routable IP configuration. In a RELEASE request, a client of ASVR 428, such as DRIF 416, 422, notifies ASVR 428 that the client IP configuration is no longer in use, and can be relinquished. In an UPDATE request, a server of ASVR 428, such as NPIF 436, 442, 448, provides ASVR 428 with a different allocated IP configuration for a preselected client, and requests the client configuration to be updated accordingly. The UPDATE request can be used when the server interface issuing the updated configuration is expected to continue providing network access to the preselected client. Such a scenario could develop during an intranetwork handoff while MS 402 moves between different coverage regions of a service network, such as moving within the range of network 454, 456, or 458. In a REVOKE request, a server of ASVR 428, such as NPIF 436, 442, 448, determines that a previously allocated IP configuration, for example of client DRIF 416, 422, is no longer valid and notifies ASVR 428 to revoke the IP configuration of the client. Although exemplary MCM 406, and ASVR 428, are illustrated to be separate from interface controllers 418, 424, 438, 444, and 450, it may be convenient to integrate ASVR 428 with interface controllers 418, 424, 438, 444, and 450, physically, as well as virtually, in MCM 406.

MS 402 is capable of supporting one or more managed TE2 (and MT0) devices 408, as hosts, using one or more carrier access method, relative to service networks 454, 456, 458. Each one of BS 460, 466, and 472 can be coupled with SNN 464, 470, 476, respectively which, in turn, can be connected to global core network 492 through associated GNN 480, 486, 488. Thus, managed devices 408 that are assigned IP configurations as hosts are capable of communicating with one or more of remote hosts 494, 496, as peers, with substantial end-to-end connectivity. Conveniently, MCM 406 is capable of coupling MS 402 to a network, such as global network 478, through one or more of managed devices 408. For example, laptop computer 410, of managed devices 408, may contain a second interface (not shown), through which device 410 can connect to network 478 via exemplary link 499. Selected embodiments of the invention herein can be used to configure computer 410 as host with a unique global ID which, in turn, may permit device 410 to serve as a gateway or router for other managed devices 408, as well as a link to other entities, including service provider networks 454, 456, 458; global network 478; and one or more of respective remote hosts 494, 496. Thus managed device 410 can provide exemplary communication link 499 from handset 414*c* to global network 478, such that the user of handset 414*c* can exchange messages with remote host #2 496. In this exemplary path, messages can be traverse the path between handset 414*c*, to WPAN 412, and to DRIF 422, through internal link 407, to DRIF 416, to laptop 410 and then via link 499 to network 478 and to remote host #2 496. Laptop 410 can be configured to communicate across link 499 unidirectionally or bidirectionally, in half- or full-duplex, using one or more wired or wireless non-ISDN-compatible physical $R_m$-side interfaces communicating using asynchronous, synchronous, isochronous, or variable-rate services. Furthermore, laptop 410 itself may communicate with link 499 using an embodiment of MSM 405, although such is not required.

Figure 5:
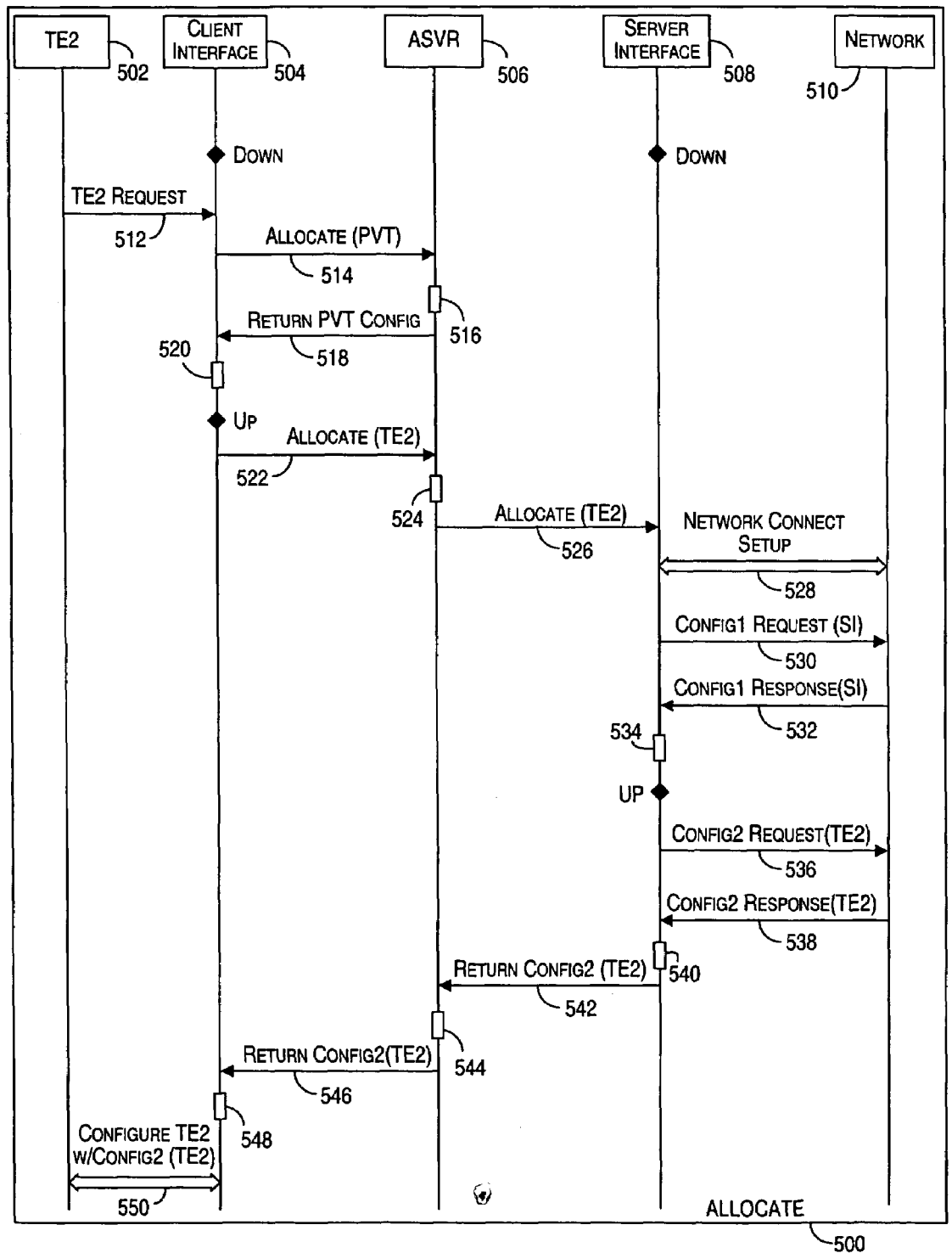
FIG. 5 is a flow interaction diagram for an exemplary ALLOCATE process embodiment.
Figure 6:
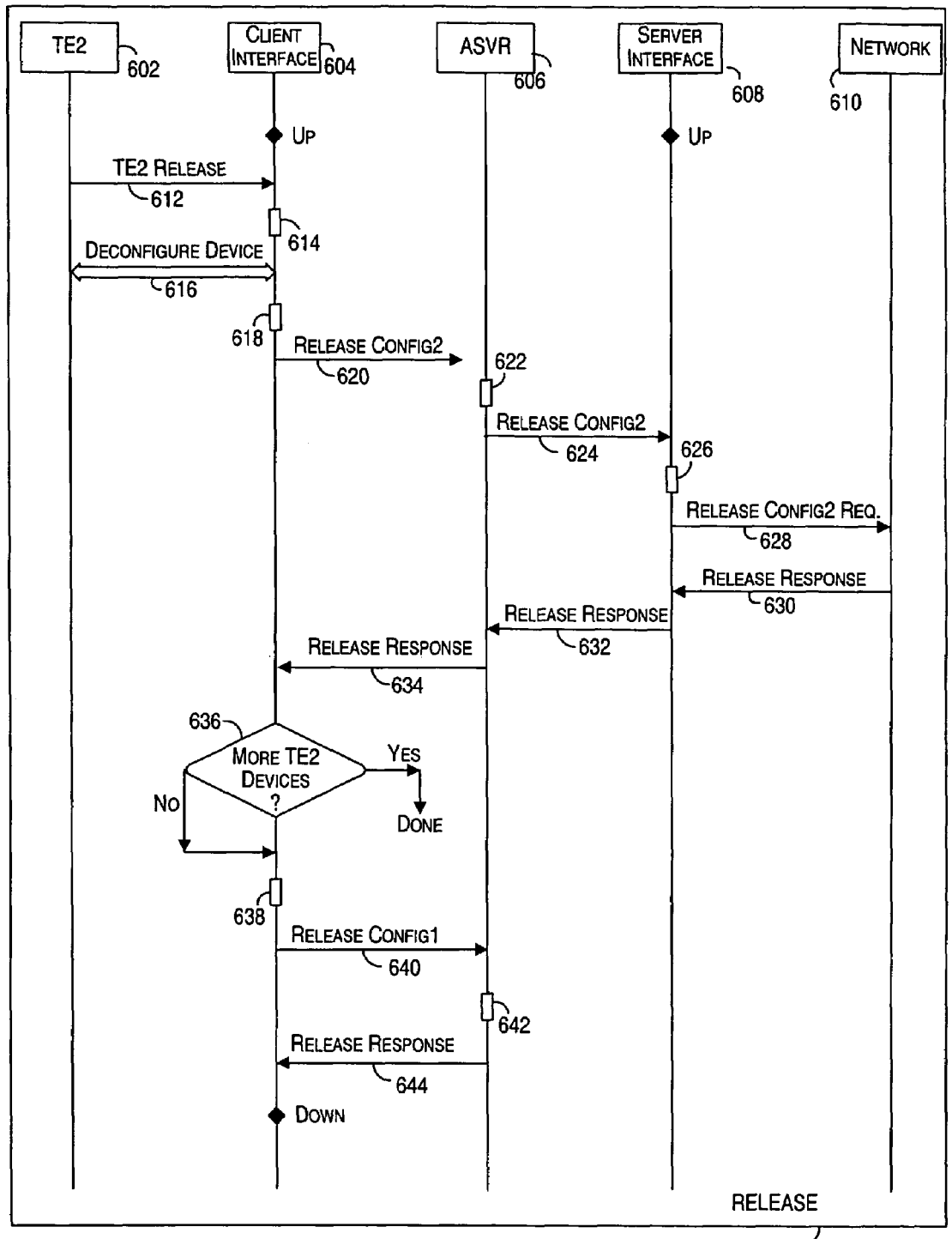
FIG. 6 is a flow interaction diagram for an exemplary RELEASE process embodiment.
Figure 7:
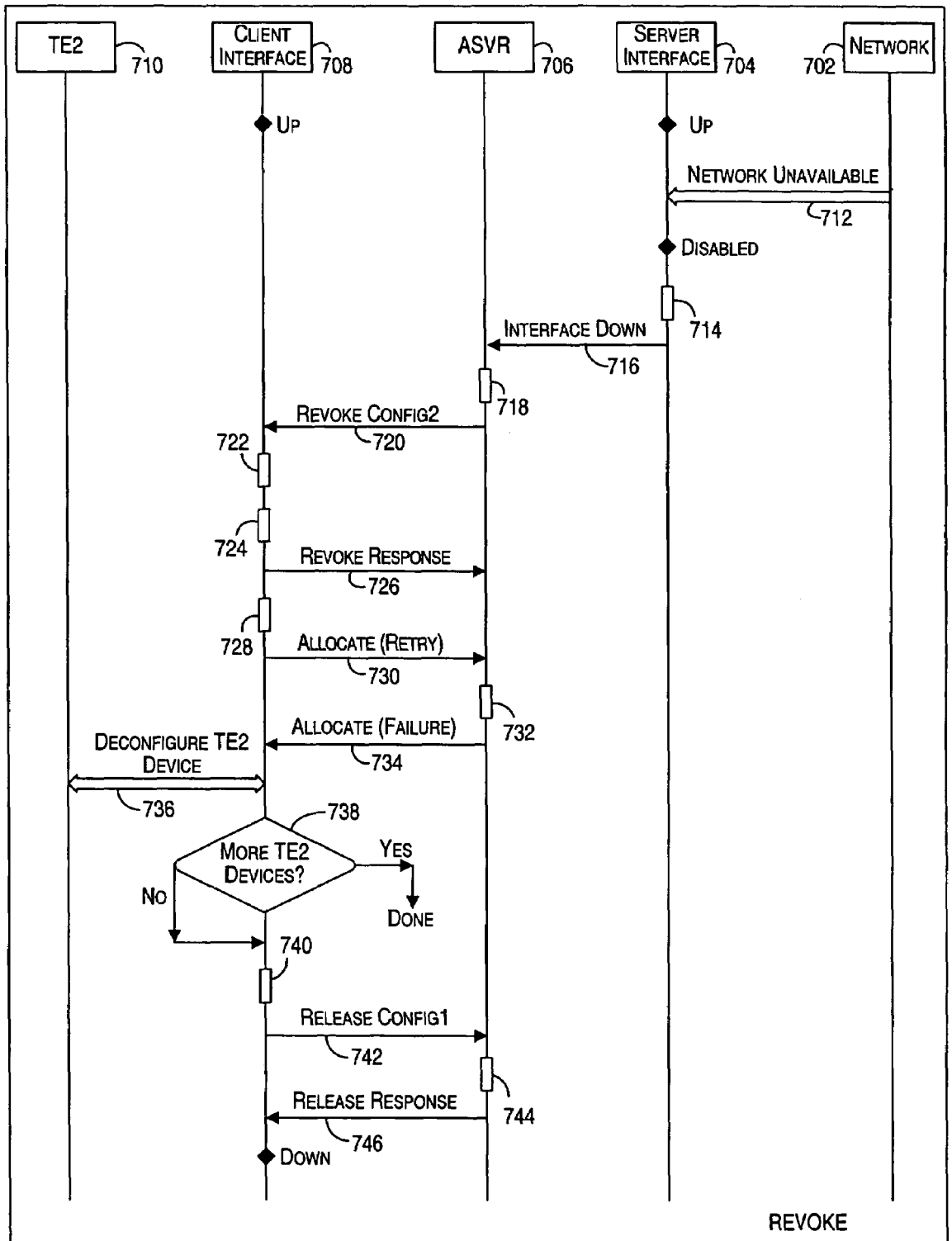
FIG. 7 is a flow interaction diagram for an exemplary REVOKE process embodiment.
Figure 8:
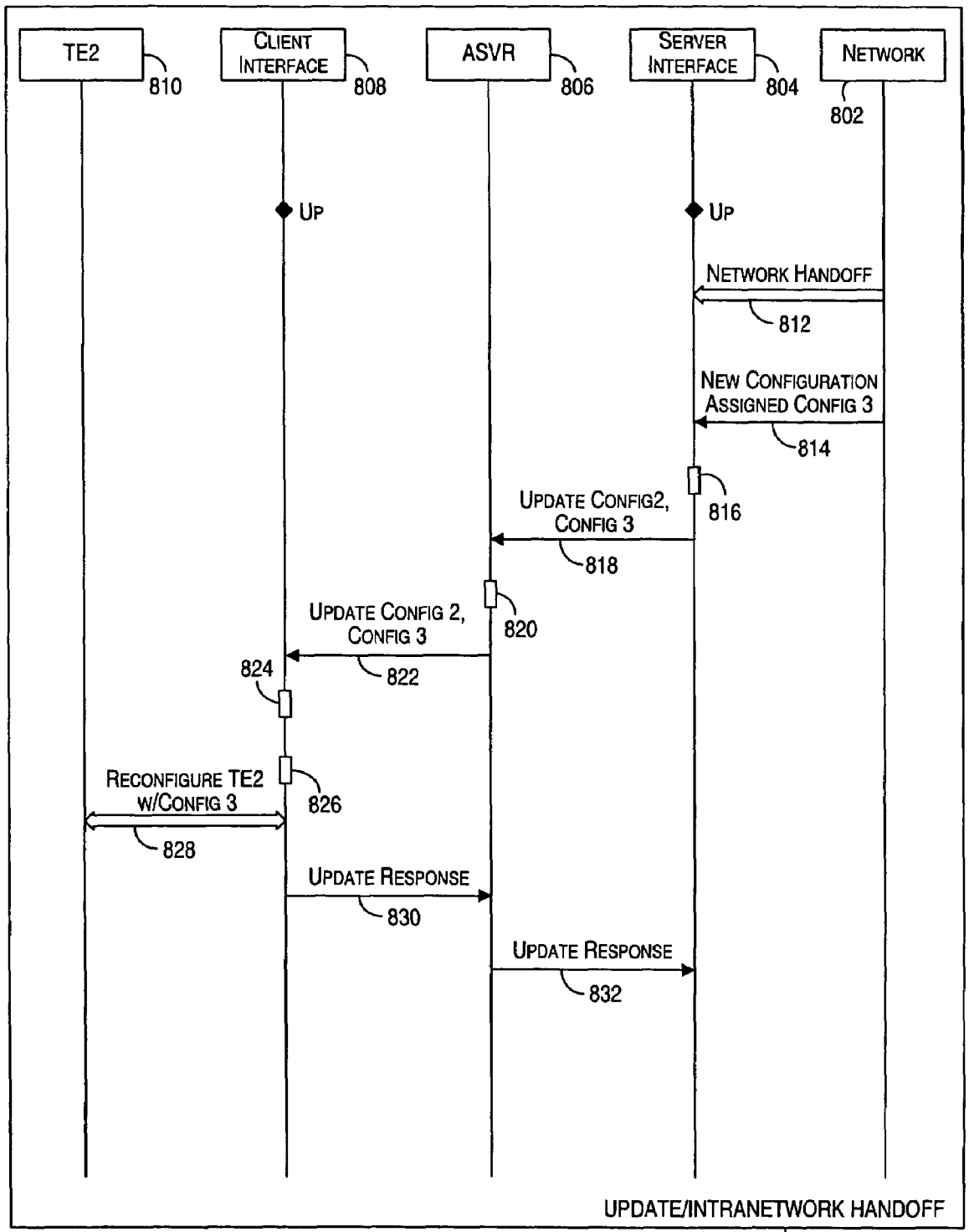
FIG. 8 is a flow interaction diagram of an exemplary UPDATE process embodiment.
Figure 9:
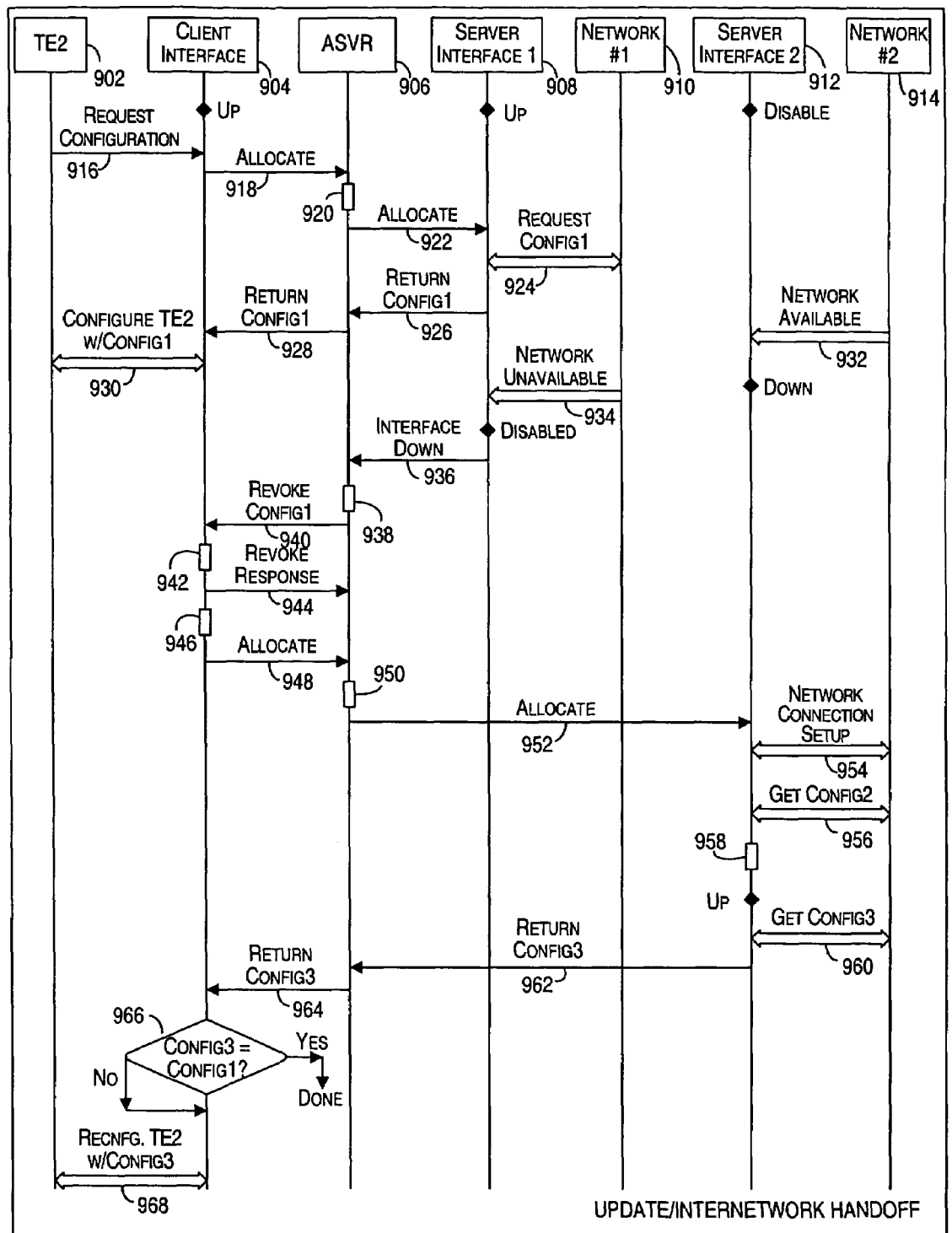
FIG. 9 is a flow interaction diagram of an exemplary inter-network handoff process embodiment.
Figure 10:
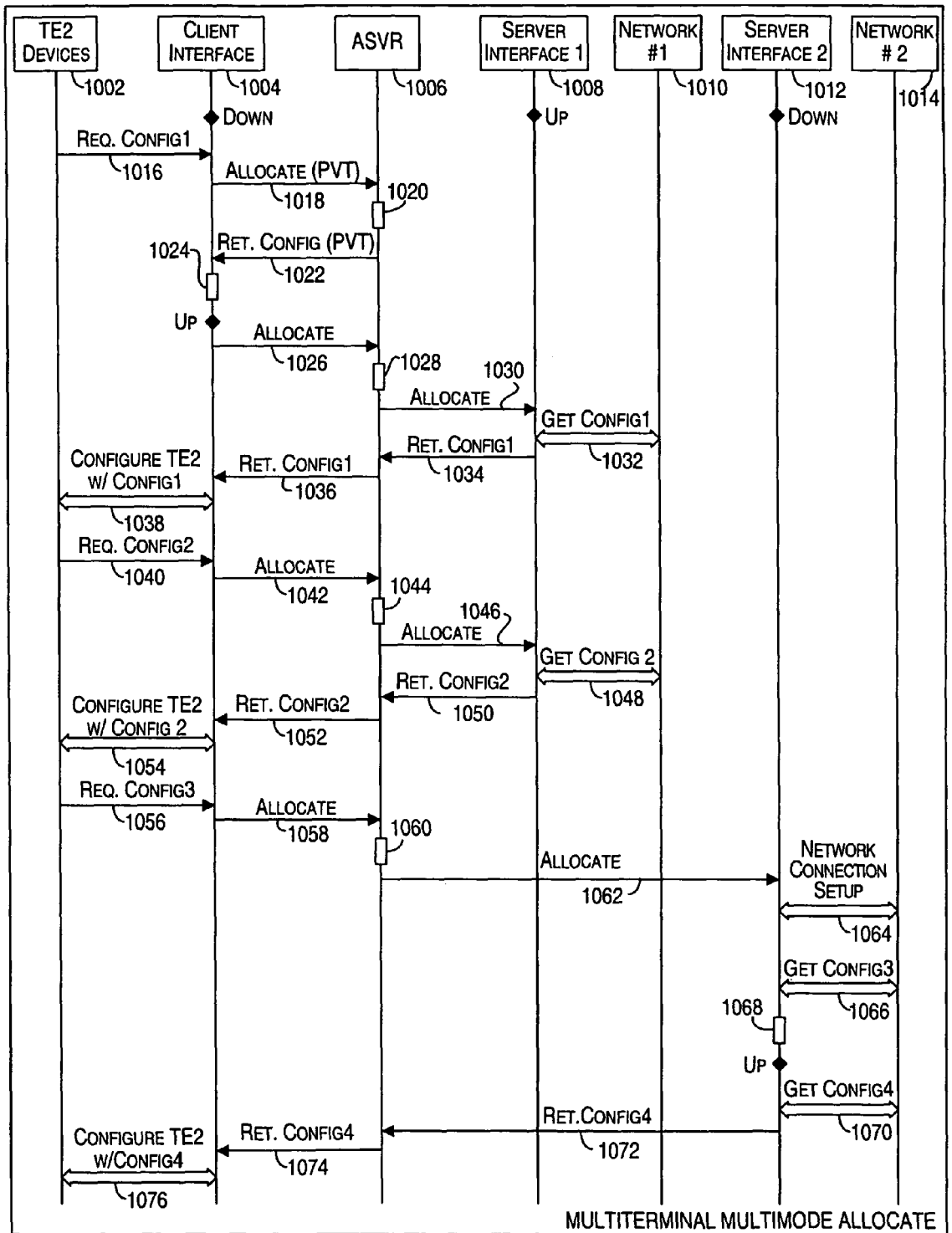
FIG. 10 is a flow interaction diagram of an exemplary multi-terminal, multimode ALLOCATE process embodiment.

FIG. 5 through FIG. 10, and the associated discussions, illustrate embodiments which are emblematic of dynamic provisioning for managed devices of an MS, such as MS 102, MS 202, MS 302, and MS 402 in FIGS. 1-4, respectively (generally, "MS"). In general, provisioning processes effect at least one of configuration, resource management, fault and event response, Quality-of-Service selection, or a combination thereof. These processes can be applied to a mobile station manager, a mobile station, a communications system, and so forth. Provisioning can include both primitive processes and composite processes, directed to facilitating the use of a managed device, for example, on a mobile wireless network. In general, a composite process may be formed from two or more primitive or composite processes. FIGS. 5-8 depict exemplary, generally primitive processes; and FIGS. 9-10 depict exemplary generally composite processes, although these processes may be adapted and other processes may be devised where such distinctions may be arbitrary. FIG. 5 represents ALLOCATE primitive process 500; FIG. 6, RELEASE primitive process 600; FIG. 7, REVOKE primitive process 700; and FIG. 8, UPDATE primitive process 800. In FIG. 9, a possible approach to an internetwork mobile station/mobile terminal handoff is described with respect to an UPDATE composite process 900; and in FIG. 10, a possible approach to a mult-terminal, multimode ALLOCATE composite process is described with respect to FIG. 10. Any of these or similar primitive may be performed serially or in parallel to effect the desired configuration of mobile terminals. In view of the foregoing teachings, a skilled practitioner could formulate and implement other aspects of the provisioning methods herein, including additional primitive processes and additional composite processes. All are contemplated to be within the scope of the invention.

Desirably, an MSM can provision resources, including unique network identities, for the connected managed devices, so that the managed devices may act as hosts on a preselected network. Advantageously an MS, according to the embodiments herein, can be a constituent of a mobile system modem. In the context of FIGS. 5-10, an MSM can include a client interface; an ASVR; and a server interface. An ASVR can dynamically provision configuration resources in an MS; a client interface is an MS interface that requests a resource from the ASVR; and a server interface is an MS interface that supplies a resource to ASVR in response to a request of a client interface. A particular interface may be a client or a server of ASVR, depending upon operation in which it is involved. On the $R_m$ side, the MSM can be connected between one or more TE2 devices; and, on the other, with one or more networks, including wireless telecommunication provider service networks, and a global internetwork, such as the Internet.

In addition, an interface that is not configured, not operational, or out-of-service can be designated as being in the DOWN state ("DOWN"). Conversely, an interface that is configured, operational, or in-service, can be designated as being in the UP state ("UP"). An interface unable to provide requested services can be designated as being in the DISABLED state ("DISABLED"). To transition from DOWN or DISABLED to UP, an interface may use specific procedures to obtain a configuration and to configure itself. Once configured, the interface may obtain one or more additional configurations, and transmit them to the requesting entity (e.g., server, interface, or managed device). An interface, whether a client interface or a server interface, may choose to pass on its configuration to a requesting entity, a decision that can be configurable through policy provisioning. A server interface that initially is UP, but that passes its configuration to a requesting entity, may be considered to be in the ROUTABLE state ("ROUTABLE"). When ROUTABLE, such a server interface may permit end-to-end communications therethrough. ROUTABLE operations are further discussed in context, below. Multiple resources, including configurations, may be provisioned by an MS, so that multiple managed devices, local applications, and network protocols may concurrently access multiple networks, each using a different carrier access method. Provisioning may be dynamic provisioning, and may be performed in real-time, or in near-real-time, to accommodate one or both of existing or anticipated communication conditions.

In response to a configuration request originated by a TE2 device, a configured client interface can receive the request and transmit the configuration to a requesting TE2 device, using any mechanism available for the access method used by the TE2 device to connect to the MSM. For example, if a TE2 device connects to MSM using a dial-up connection over a serial bus, the configuration information can be passed using Point-to-Point (PPP) negotiation. PPP techniques are well-known in the art and are described in detail in IETF Standard STD0051: "The Point-to-Point Protocol (PPP)," W. Simpson, Ed., July 1994 (includes IETF RFC1661, IETF RFC1662). Additionally, if TE2 device connects to MSM over an 802.11b WLAN access method, the network configuration can be passed to the TE2 device using DHCP, ARP, or another suitable configuration provisioning mechanism. If a client interface is unconfigured at the time of the request from the TE2 device, the client interface may first request that a configuration be provisioned for the interface. Once the configuration is received, it may be desirable for the client interface to request an additional configuration for the TE2 device, while it configure itself with the initially provisioned resources.

When unconfigured, a server interface may use a configuration obtained from a network configuration server to configure itself, using any mechanism available with the particular network accessed. Where a server interface passes its configuration to a requesting entity, the server may allow messages to be forwarded through the server interface, but may not grant local applications access to the interface, until once again it is configured. Local applications may use the configured interface to access the network to which the interface is coupled, while the server interface requests additional resources from the network. In addition, address management protocols, e.g., DHCP, may operate over the interface to obtain additional configurations for the MS. Conveniently, a server can remain unconfigured, and pass on its configuration to a requesting client, which then can provide the configuration to the TE2 device originating a configuration request. Also, a server also can be disposed to deconfigure itself, and pass along its configuration to satisfy a configuration request.

Turning to FIG. 5, an embodiment of IP configuration ALLOCATE process 500 is illustrated. Process 500 can be implemented by the cooperative interaction of TE2 device 502, configuration client interface 504, ASVR 506, configuration server interface 508, and communication network 510.

It is desirable that ASVR manage a reserve, or pool, of unallocated IP configurations to facilitate requests internal to the MS. Process 500 can be initiated when a mobile terminal (TE2 device 502) alerts client interface 504 that it desires a selected resource, such as a unique network configuration (Operation 512). The alert may be in the form of client interface 504 receiving notice that TE2 device 502 is attaching to client interface 504, or may be as an explicit request for the resource from TE2 device 502. Desirably, client interface 504 is UP (i.e., configured/operational or in-service) at the time of the request. If not, client interface 504 requests ASVR 506 to ALLOCATE resources (Operation 514), which can be used to bring interface 504 UP and dispose interface 504 to complete the original TE2 ALLOCATE request.

An exemplary resource can be a private IP configuration from the unallocated IP configuration pool. In response to the client interface 504 request, ASVR 506 can allocate (Operation 516), and return (Operation 518), a private IP configuration for client interface 504. Client interface 504 can assign to itself the private IP configuration thus allocated, and come UP (Operation 520). Once configured and UP, client interface 504 requests ASVR 506 to ALLOCATE the unique network configuration for TE2 device 502 (Operation 522). Should client interface 504 already be UP during Operation 512, some or all of Operations 514, 516, 518, and 520 may be bypassed, and the ALLOCATE request can be transmitted to ASVR 506 in response to the alert received during Operation 512.

Upon receiving the ALLOCATE request of Operation 522, ASVR 506 employs a predetermined provisioning procedure to identify the network that can supply the requested resources, the best available interface having access to that network, and being capable of allocating the requested network reources (Operation 524), including a unique IP-routable configuration, QoS-matched services, etc. This feature of ASVR 506 can be especially desirable with TE2 devices, which generally are unable to identify, locate, and connect with, needed resources. The interface selected by ASVR 506 is designated to be server interface 508, to which ASVR 506 transmits the ALLOCATE request (Operation 526).

In the event that server interface 508 is DOWN (i.e., not configured/operational or out-of-service), it is desirable that interface 508 come UP (i.e., configured/operational or in-service) to complete the ALLOCATE request. Thus, interface 508 establishes a network connection (Operation 528), using a preselected wireless communication protocol over a preselected carrier access method, and requests network 510 to allocate the unique network configuration from the its resources (Operation 530). In response, network 510 obtains the unique network configuration (CONFIG1) using whatever means are available, such as requesting and receiving CONFIG1 from a configuration server coupled to network 510. In turn, network 510 responds to the ALLOCATE request of server interface 508 by supplying CONFIG1 to server interface 508 (Operation 532). Interface 508 assigns to itself the network IP configuration thus allocated, and comes UP (Operation 534). Once configured and UP, server interface 508 requests network 510 to ALLOCATE a second unique network configuration (e.g., a globally-routable IP configuration) for sending to ASVR 506 (Operation 536). In response, network 510 obtains the unique network configuration (CONFIG2) using whatever means are available, such as requesting and receiving CONFIG2 from a network configuration server coupled to network 510. In turn, network 510 responds to the ALLOCATE request of server interface 508 by supplying CONFIG2 to server interface 508 (Operation 538). The routing information for the unique network configuration CONFIG2, obtained during Operation 538, can then be updated to reflect that it is intended for the particular client, which made the request during Operation 526 (Operation 540).

In response to the request made during the ALLOCATE of Operation 526, server interface 508 provides the unique network configuration CONFIG2 to ASVR 506 during Operation 542. ASVR 506 can examine CONFIG2 to determine whether it conflicts with any previously assigned configurations (Operation 544). If it does not, CONFIG2 can be transmitted to client interface 504 (Operation 546), after which client interface 504 updates the routing information for the IP configuration CONFIG2 to reflect that it is intended for mobile terminal 502, which made the initial request during Operation 512 (Operation 548). TE2 502 then can be configured with the unique network configuration information thus obtained (Operation 550), and be ready to communicate as a peer host with a remote host connected to network 510.

It may be beneficial to implement a provisioning policy whereby ASVR 506 is disposed to ALLOCATE multiple configurations via client interface 504, substantially simultaneously. Likewise, it may be beneficial to implement a provisioning policy whereby ASVR 506 is disposed to ALLOCATE multiple configurations via server interface 508, substantially simultaneously. Using such provisioning policies, ASVR 506 ordinarily acts upon configured server interface 508 to obtain and allocate a network resource (e.g., a unique configuration) from network 510, on behalf of one or more requesting client interfaces 504. When received from network 510, ASVR 506 can direct the obtained resources to the respective requesting client interfaces 504. In turn, respective requesting client interfaces 504 may use respective obtained resources to configure respective managed TE2 devices 502. So configured, respective managed devices 502 are capable of communicating as uniquely-identified host devices over communication network 510.

Under certain circumstances, server interface 510 may not be configured at the time ASVR 506 demands a unique resource on behalf of client interface 504. It generally is desirable that server interface 508 obtain an initial resource (configuration) from communication network 510, and configure itself with the resource, bringing server interface 508 UP. Typically, when UP, server interface 508 can obtain additional requested resources from network 510 and pass them to ASVR 506. As before, ASVR 506, in turn, directs the resources to respective client interfaces 504 for use in conjunction with respective requesting managed devices 502. After being configured by respective client interfaces 504, respective managed devices 502 generally are uniquely identified relative to communication network 510, and configured as communication endpoints, or local hosts.

In some contexts, configured server interface 508 may temporarily be unable to obtain another resource on behalf of client interface 504. For example, technology constraints in certain types of networks 510 may limit the number of substantially simultaneous configurations that server interface 508 will be provided at a given time. Nevertheless, advantageous aspects of server interface 508 can facilitate communication over communication network 510 between the intended endpoint hosts, including the local managed TE2 device 502. In accordance with certain of these aspects, server interface 508 is capable of passing its network resource (or configuration) to a requesting client interface 504, without entering the DOWN state. Client interface 504 can use the passed-on resource to configure requesting managed TE2 device 502, attached thereto, as a local host. Despite relinquishing its configuration to client interface 504, server interface 508 can be adapted to permit message traffic flow between communication endpoints, including managed device 502, which received the resource originally held by server interface 508. A server interface operating within such a context can be considered to be in a ROUTABLE state. While in a ROUTABLE state, server interface 508 may permit end-to-end communications therethrough, but may not provide access to local applications. In yet other circumstances, where server interface is unable to obtain one network resource (configuration) from network 510, the ALLOCATE request fails. Typically, server interface 508 notifies client interface 504 of the request failure, through ASVR 506. Additionally, it may be desirable to provide a perceptible indication corresponding to an ALLOCATE request failure, such as by a display on respective managed device 502 corresponding to the failed ALLOCATE request.

Where client interface 504 and server interface 508 are already configured/operational or in-service (i.e., UP), the portion of ALLOCATE process 500, which is sequenced toward the network 510, may be simplified to include the alert/request by TE2 502 (Operation 512); the client interface 504/ASVR 506 ALLOCATE request (Operation 522); the selection by ASVR 506 of server interface 508 (Operation 524); the ALLOCATE request by ASVR 506 to interface server 508 (Operation 526); and the IP configuration request by interface server 508 to network 510 (Operation 536). The portion of ALLOCATE process 500, which is sequenced toward host 502 may still include updating the routing information for the IP configuration thus obtained (Operation 540); server interface 508 provides IP configuration CONFIG2 to ASVR 506 (Operation 542), in response to the request made during the ALLOCATE of Operation 526; after which ASVR 506 can examine the IP configuration to determine whether it conflicts with any previously assigned configurations (Operation 544). If it does not, the IP configuration can be transmitted to client interface 504 (Operation 546), after which client interface 504 updates the routing information for the IP configuration to reflect that the is intended for TE2, which made the initial request during Operation 512 (Operation 548). As before, TE2 502 can then be configured with the resources thus obtained (Operation 550), such as globally-unique IP configuration information. Once configured, TE2 device 502 can act as a peer host communicating with a remote host, both of which being connected to network 510.

FIG. 6 illustrates a sequence diagram representative of an embodiment of RELEASE provisioning process 600, for example, to release a mobile terminal IP configuration. Process 600 can be implemented by the cooperative interaction of TE2 device 602, configuration client interface 604, ASVR 606, configuration server interface 608, and communication network 610. Server interface 608 communicates with communication network 610, using a preselected wireless communication protocol over a preselected carrier access method. In this example, it is desirable that client interface 604 and server interface 608 are already configured/operational or in-service (i.e., UP).

In RELEASE process 600, TE2 device 602 may alert client interface 604 that the IP configuration assigned thereto may be relinquished (Operation 612). Alternatively, TE2 device 602 may be disconnected from the MS to which client interface 604 is attached. In response, client interface 604 identifies the IP configuration of TE2 device 602, e.g., CONFIG2, (Operation 614), and deconfigures the TE2 device 602 (Operation 616). Client interface 604 can update routing information to reflect that TE2 device 602 is no longer configured to communicate over network 610 (Operation 618). Accordingly, client interface 604 notifies ASVR 606 that CONFIG2 may be released (Operation 620). Here, CONFIG2 is an IP-routable configuration, thus, ASVR 606 identifies the interface serving CONFIG2 (Operation 622) and notifies the identified server interface, in this case, interface 608, to RELEASE CONFIG2 (Operation 624). Conveniently, server interface 608 may manage a routing table for configurations that it serves and, in response to the RELEASE request of Operation 624, server interface 608 can update this routing table by removing CONFIG2 (Operation 626). With CONFIG2 no longer needed by the MS to which TE2 602 was attached, server interface 608 transmits a RELEASE request for CONFIG2 to network 610 (Operation 628). Where network 610 accepts the RELEASE request in Operation 628, it transmits a RELEASE acknowledgement to server interface 608 (Operation 630). If itself unconfigured, server interface 608 may use the released configuration to bring itself UP from the ROUTABLE state. By doing so, interface 608 can provide access by local applications to the respective associated entity 610.

Likewise, a RELEASE acknowledgement can be transmitted from server interface 608 to ASVR 606 (Operation 632), and from ASVR 606 to client interface 604 (Operation 634). Client interface 604 can examine the PIFs associated therewith to determine whether other TE2 devices remain attached and operating (Operation 636). If so, interface 604 can continue routine operations. If not, and it is desired for interface 604 to go offline, client interface 604 can collect local configuration information (e.g., CONFIG1) (Operation 638), and notify ASVR 606 to RELEASE CONFIG1 (Operation 640). ASVR 606 releases CONFIG1, returning the configuration to the pool of private configurations which ASVR 606 manages (Operation 642). ASVR 606 notifies client interface 604 that CONFIG1 is released (Operation 644) and, if such is desired, client interface 604 goes DOWN.

Typically, when a resource (configuration) is subject to RELEASE from the associated managed device 602 by client interface 604, ASVR 606 receives the resource from client interface 604. In turn, ASVR 606 effects RELEASE of the resource to network 610 through server interface 608. Under certain circumstances, though, it may be desirable for server interface 608 to retain the resource. For example, as described relative to the ALLOCATE process, server interface 508 may be configured as ROUTABLE, i.e., be capable of facilitating end-to-end message transfer therethrough, while lacking a respective resource, or configuration. It may be desirable, then, for server interface 608, when in a ROUTABLE state, to retain a released configuration, and to use that resource to configure itself, thereby bringing itself into the UP state. By bringing itself UP, server interface 608 allows local applications to access network 610. Similarly, it may be advantageous to retain a released resource (configuration) to bring UP an interface that otherwise may be DOWN or DISABLED.

FIG. 7 illustrates a sequence diagram that is representative of an embodiment of REVOKE provisioning process 700, as may be used to revoke an IP configuration. Process 700 can be implemented by the cooperative interaction of communication network 702, configuration server interface 704, ASVR 706, configuration client interface 708, and TE2 device 710. Server interface 704 communicates with communication network 702 using a preselected wireless communication protocol over a preselected carrier access method. In this example, it is desirable that server interface 704 and client interface 708 are already configured/operational or in-service (i.e., UP). In addition, for the purposes of this example, configuration revocation is a result of network 702 becoming unavailable. However, other circumstances leading to configuration revocation also may occur. Typically, server interface 704 monitors the availability and integrity of its communication link to network 702 and thus, interface 704 is notified when network 702 becomes unavailable, either as sensed by server interface 704, or when notified by network 702 (Operation 712). Upon such notification, server interface 704 enters the DISABLED state, updates its routing table accordingly (Operation 714), and notifies ASVR 706 that server interface 704 is DOWN (Operation 716). ASVR 706 may review its routing tables to identify and update the client interfaces and device configurations that were allocated by server interface 704 (Operation 718). For the present example, ASVR 706 identifies during Operation 718 that client interface 708 was allocated CONFIG2. ASVR 706 notifies client interface 708 that CONFIG2 is to be revoked (Operation 720). In response, client interface 708 identifies which TE2 device is configured with CONFIG2 (Operation 722); updates the routing table for interface 708 to indicate that TE2 710 is DOWN (Operation 724); and sends ASVR 706 an acknowledgement of the REVOKE notification (Operation 726). If such is indicated by a provisioning policy, client interface 708 can prepare another ALLOCATE request for a server interface different from server interface 704 (Operation 728), in an effort to avoid deconfiguring TE2 device 710. ASVR 706 can use the new ALLOCATE request to locate another server interface and, if successful, ALLOCATE another IP configuration via that server interface (Operation 730).

For the present example, ASVR 706 is unable to identify a suitable substitute server interface, by which to provision an IP configuration request (Operation 732), and notifies client interface 708 that the ALLOCATE request failed (Operation 734). With CONFIG2 previously being revoked by ASVR 706, and ASVR 706 being unable to identify a suitable substitute server interface through which to allocate another global IP configuration, client interface 708 deconfigures and takes DOWN TE2 device 710 (Operation 736). Client interface 708 can examine the operational information associated therewith (e.g., PIF signals) to determine whether other TE2 devices remain attached and operating (Operation 738). If so, interface 708 may continue routine operations. If not, and it is desired for interface 708 to go offline, client interface 708 can collect local configuration information (e.g., CONFIG1) (Operation 740), and notify ASVR 706 to RELEASE CONFIG1 (Operation 742). ASVR 706 releases CONFIG1, returning the configuration to the pool of private configurations which ASVR 706 manages (Operation 744). ASVR 706 may notify client interface 708 that CONFIG1 is released (Operation 746) and, if such is desired, client interface 708 goes DOWN.

FIG. 8 illustrates a sequence diagram that is representative of an embodiment of UPDATE provisioning process 800, as may be performed when updating IP configuration. Process 800 can be implemented by the cooperative interaction of communication network 802, configuration server interface 804, ASVR 806, configuration client interface 808, and TE2 device 810. Server interface 804 communicates with communication network 802 using a preselected wireless communication protocol over a preselected carrier access method. In this example, it is desirable that server interface 804 and client interface 808 are already configured/operational or in-service (i.e., UP), and that TE2 device 810 be configured with IP configuration CONFIG2. Also, for the purposes of this example, the exemplary UPDATE provisioning process 800 in FIG. 8 can be a result of the user of TE2 device 810 roaming within a region of operation, from one network point of attachment, or service sector, to another (e.g., intranetwork handoff between adjacent BSs). Furthermore, exemplary UPDATE process 800 illustrates a change in configuration using a configuration for server interface 804 that does not change during the handoff.

Typically, server interface 804 monitors the availability and integrity of its communication link to network 802 and thus, interface 804 is notified when an intranetwork handoff initiates (Operation 812), either as sensed by server interface 804, or when notified by network 802. In anticipation of the handoff, network 802 assigns another IP configuration, e.g., CONFIG3, and transmits CONFIG3 to server interface 804 (Operation 814) for ultimate use with TE2 810. Server interface 804 updates the routing table entry associated with TE2 device 810 (Operation 816), and transmits to ASVR 806 an UPDATE request where CONFIG2 is to be updated with CONFIG3 (Operation 818). After receiving the UPDATE request, ASVR 806 identifies the client interface to which CONFIG2 is assigned (Operation 820). Once identified, ASVR 806 issues an UPDATE request to client interface 808 to replace CONFIG2 with CONFIG3 (Operation 822). In response, client interface 808 identifies the managed TE2 device using CONFIG2 (Operation 824), and updates its routing table entry for TE2 device 810 with CONFIG3 accordingly (Operation 826). Client interface 808 reconfigures managed TE2 device 810 with CONFIG3, permitting TE2 to continue communicating as a host device with other hosts connected to network 802. It is desirable that process 800 be sufficiently transparent to a user of TE2 device 802 that the update or intranetwork handoff is substantially imperceptible. However, the extent to which an update or an intranetwork handoff is substantially imperceptible, or even possible, usually is grounded in the characteristics of the TE2 device and not the MS device in which interfaces 804, 808 and ASVR 806 are disposed.

As an MS user roams throughout various service provider network regions of operation, the user may leave a first service provider network coverage region based on a first carrier access method, e.g., based on CDMA-1xEVDO technology, and enter a second service provider network coverage region based on a second carrier access method, e.g., based on GSM-1900 technology. Accordingly, FIG. 9 illustrates a sequence diagram that is representative of UPDATE provisioning process 900, involving a change in service networks as well as a change in host IP configuration. Process 900 can be implemented by the cooperative interaction of TE2 device 902, configuration client interface 904, ASVR 906, first configuration server interface 908, first communication network 910, second configuration server interface 912, and second communication network 914. The communication between first server interface 908 and first network 910 uses a first wireless communication protocol over a first carrier access method. The communication between second server interface 912 and second network 914 uses a second wireless communication protocol over a second carrier access method. The first wireless communication protocol may be different from the second wireless communication protocol; the first carrier access method may be different from the second carrier access method. In this example, it is desirable that client interface 904 and first server interface 908 are already configured/operational or in-service (i.e., UP); that TE2 is initially not configured; that TE2 is initially within the service region of first network 910; and that second server interface 912 is initially disabled.

In the example of FIG. 9, process 900 can be initiated when TE2 device 902 alerts configuration client interface 904 (Operation 916) that it desires a configuration. The alert may be in the form of interface 904 being notified that TE2 device 902 is attaching to it, or may be an explicit request for a resource (e.g., a unique network configuration) from the mobile terminal (TE2 device). Client interface 904 can request ASVR 906 to ALLOCATE an IP configuration for TE2 device 902 (Operation 918). Upon receiving the ALLOCATE request from client interface 904, ASVR 906 can employ a predetermined provisioning procedure to identify which network 912, 914 can provide the requested resource; as well as which available interface (e.g., NPIF) both is suited to access the identified network 912, 914, and is capable of participating in providing the requested resource (Operation 920), e.g. an IP-routable configuration. The available interface so identified is selected to be server interface 908, and ASVR 906 conveys the ALLOCATE request to server interface 908 (Operation 922). Server interface 908, usually having a pre-existing network connection, requests network 910 to allocate a unique network configuration (CONFIG1) from the its resources, using whatever means are available and, in turn, network 910 responds to the ALLOCATE request by supplying CONFIG1 to server interface 908 (collectively, Operation 924). In response to the request made during the ALLOCATE of Operation 922, server interface 908 provides IP configuration CONFIG1 to ASVR 906 (Operation 926). Likewise, in response to the request made during the ALLOCATE request of Operation 918, ASVR 906 provides IP configuration CONFIG1 to client interface 904 (Operation 928). Client interface 904 can configure TE2 device 902 as a host with the unique network configuration (CONFIG1), allowing TE2 device 902 to communicate with other hosts via first network 910 (Operation 930).

Typically, adjacent service areas have a degree of overlapping coverage, and a user may enter an area of service for a second network prior to leaving the area of service for the first network. Thus, as indicated in FIG. 9, second network 914 can become available (Operation 932) concurrently with first network 910. In the present example, second server interface 912 is adapted for using a second wireless communication protocol over a second carrier access method of second network 914, and can respond to the availability of network by unattended switching from the DISABLED state to the DOWN state. Alternatively, the change may be initiated by an MS user actively selecting to use second network 914. As first network 910 becomes unavailable (Operation 934), first server interface 908 transitions to the DISABLED state, and transmits an DOWN notification to ASVR 906 (Operation 936). In response, ASVR 906 identifies those interfaces with configurations allocated by first server interface 908 (Operation 938). In this example, ASVR 906 identifies that client interface 904 was allocated IP configuration CONFIG1 by first server interface 912. ASVR 906 directs client interface 904 to REVOKE CONFIG1 (Operation 940). Client interface 904 determines which TE2 device was configured with CONFIG1 (Operation 942), and transmits a REVOKE response/acknowledgement to ASVR 906 (Operation 944). As before with Operation 730 in REVOKE process 700 in FIG. 7, a client interface, such as client interface 904, will seek to identify another server interface that can allocate a configuration for TE2 device 902 (Operation 946). Accordingly, client interface 904 can issue an ALLOCATE request (Operation 948).

Responsive to the ALLOCATE request, ASVR 906 can examine its resources to determine whether another suitable server interface both is available and is prepared to provide a new IP configuration (Operation 950). In this example, ASVR 906 identifies that interface 912 is a suitable interface, and transmits an ALLOCATE command to second server interface 912 (Operation 952). In the event that server interface 912 is DOWN, as is the case in FIG. 9, interface 912 establishes a network connection (Operation 954) to facilitate the ALLOCATE request. Being connected with network 914, second server interface 912 requests and receives a unique network configuration, here globally-routable IP configuration CONFIG2, from second network 914 using whatever means are available, e.g., obtaining CONFIG2 from DHCP on network 914 (Operation 956). Second server interface 912 assigns to itself the network IP configuration CONFIG2 thus allocated, and transitions to the UP state (Operation 958). Once configured and UP, second server interface 912 can request and receive from second network 914 (Operation 960), a second unique network configuration (e.g., globally-routable IP configuration CONFIG3). Second server interface 912 can transmit CONFIG3 information to ASVR 906 (Operation 962), in response to the previous ASVR ALLOCATE request (Operation 952). ASVR 906 conveys CONFIG3 information to client interface 904 (Operation 964) that, in turn, determines which TE2 device is to receive CONFIG3, in place of the revoked CONFIG1 (Operation 966). In this example, client interface 904 identifies TE device 902 as the recipient of CONFIG3, reconfiguring TE2 902 with CONFIG3, so that TE2 902 may continue to be a host device, although connected with second service network 914 (Operation 968). It is desirable that process 900 be sufficiently transparent to a user of TE2 device 902 that the handoff between first service network 910 and second service network 914 is substantially imperceptible. As with the provisioning method of FIG. 8, the extent to which the handoff between first service network 910 and second service network 914 is substantially imperceptible, or even possible, is usually grounded in the characteristics of TE2 device 902.

As discussed relative to FIG. 5, configured server interfaces 908, 912 may temporarily be unable to obtain another resource on behalf of client interface 904. Nevertheless, advantageous aspects of server interfaces 908, 912 can facilitate communication over communication networks 910, 914 between the intended endpoint hosts, including the local managed TE2 device 902. In accordance with certain of these aspects, server interfaces 908, 912 are capable of passing respective network resources (or configurations) to a requesting client interface 904, without entering the DOWN state. Client interface 904 can use the passed-on resource to configure requesting managed TE2 device 902, attached thereto, as a local host. Despite relinquishing its configuration to client interface 904, respective server interface 908, 912 can be adapted to permit message traffic flow between communication endpoints, including managed device 902, which received the resource originally held by respective server interface 908, 912. As with server interface 508 in FIG. 5, server interface 908, 912, when operating within such a context, can be considered to be in a ROUTABLE state. While in a ROUTABLE state, server interface 908, 912 may permit end-to-end communications therethrough, but may not provide access to local applications. In yet other circumstances, where server interface is unable to obtain one network resource (configuration) from respective network 910, 914, the ALLOCATE request fails. Typically, server interface 908, 912 notifies client interface 904 of the request failure, through ASVR 906. Additionally, it may be desirable to provide a perceptible indication corresponding to an ALLOCATE request failure, such as by a display on respective managed device 902 corresponding to the failed ALLOCATE request. However, to the extent it is possible to do so, ASVR 906 may attempt to satisfy a failed ALLOCATE request to network 910, with a subsequent request to network 914, and vice versa.

FIG. 10 illustrates an embodiment of a multi-host, multi-mode ALLOCATE provisioning process 1000, in which first and second TE2 devices are allocated IP configurations for operation as hosts on a first communication network, and a third TE2 device is allocated an IP configuration for operation as a host on a second communication network. Process 1000 can be implemented by the cooperative interaction of TE2 devices 1002, first configuration client interface 1004, ASVR 1006, first configuration server interface 1008, first communication network 1010, second configuration server interface 1012, and second communication network 1014. The communication between first server interface 1008 and first network 1010 can use a first wireless communication protocol over a first carrier access method. The communication between second server interface 1012 and second network 1014 uses a second wireless communication protocol over a second carrier access method. The first wireless communication protocol may be different from the second wireless communication protocol; the first carrier access method may be different from the second carrier access method.

Typically, process 1000 is initiated when first TE2 device 1002 alerts client interface 1004 that it desires a configuration (Operation 1016). The alert may be in the form of interface 1004 being notified that first TE2 device 1002 is attaching to interface 1004, or may be an explicit request for a unique network configuration from mobile terminal (TE2 device). In the event that interface 1004 is DOWN, it is desirable that interface 1004 come UP to complete the ALLOCATE request. Thus, interface 1004 requests ASVR 1006 to allocate a private IP configuration (PVT) from the unallocated IP configuration pool (Operation 1018). In response, ASVR 1006 allocates a private IP configuration for client interface 1004 (Operation 1020), and returns the private configuration (PVT) to interface 1004 (Operation 1022). Client interface 1004 assigns to itself the private IP configuration thus allocated and comes UP (Operation 1024). Once configured and UP, client interface 1004 requests ASVR 1006 to ALLOCATE an IP configuration for first TE2 device 1002 (Operation 1026). Upon receiving the ALLOCATE request of Operation 1026, ASVR 1006 employs a predetermined provisioning procedure to identify the most suitable interface (e.g., NPIF) that has access to first network 1010, and is capable of allocating an IP routable configuration (Operation 1028). The NPIF interface so identified is chosen to be first server interface 1008, and ASVR 1006 transmits the ALLOCATE request from client interface 1004 to first server interface 1008 (Operation 1030). First server interface 1008 requests and receives a unique network configuration, here globally-routable IP configuration CONFIG1, from first network 1010 using whatever means are available (Operation 1032). First server interface 1008 transmits CONFIG1 to ASVR 1006 (Operation 1034) which, in turn, transmits CONFIG1 to client interface 1004 (Operation 1036). Client interface 1004 determines that CONFIG1 does not conflict with other configurations and configures first TE2 device 1002 with CONFIG1 (Operation 1038).

In the example of FIG. 10, when second TE2 device 1002 requests an IP configuration (Operation 1040), client interface 1004 is in the UP state. Thus, client interface 1004 may request ASVR 1006 to ALLOCATE an IP configuration for second TE2 device 1002 (Operation 1042), without obtaining a configuration for itself. Upon receiving the ALLOCATE request of Operation 1042, ASVR 1006 again employs a predetermined provisioning procedure to identify the most suitable interface (e.g., NPIF) that both has access to first communication network 1010, and is capable of allocating an IP routable configuration (Operation 1044). The NPIF interface identified again may be chosen to be first server interface 1008, to which ASVR 1006 transmits the ALLOCATE request from client interface 1004 (Operation 1046). As before, first server interface 1008 requests and receives a resource, here a unique network resource such as the globally-routable IP configuration CONFIG2, from first network 1010 using whatever means are available (Operation 1048). First server interface 1008 transmits CONFIG2 to ASVR 1006 (Operation 1050) which, in turn, transmits CONFIG2 to client interface 1004 (Operation 1052). Client interface 1004 determines that CONFIG2 does not conflict with other configurations and configures second TE2 device 1002 with CONFIG2 (Operation 1054).

Third TE2 device 1002, which also may be connected with client interface 1004, can make a specific provisioning request, including an IP configuration for a particular type of user service to be delivered to meet a selected Quality-of-Service criterion (Operation 1056). Client 1004 can request ASVR 1006 to ALLOCATE an IP configuration for third TE2 device 1002 (Operation 1058), without obtaining a configuration for itself. Upon receiving the ALLOCATE request of Operation 1058, ASVR 1006 can identify a particular network, here second communication network 1014, which can provide the desired user service while meeting an exemplary selected criterion, for example, Quality-of-Service. This identification feature of ASVR 1006 can be especially desirable when using TE2 devices, which generally are unable to identify and connect with needed resources. After identifying network 1014, ASVR 1006 again employs a predetermined provisioning procedure to identify the most suitable interface (e.g., NPIF) that both has access to second communication network 1014, and is capable of allocating an IP routable configuration (Operation 1060). In this case, the identified available interface is chosen to be second server interface 1012, to which ASVR 1006 transmits the ALLOCATE request from client interface 1004 (Operation 1062). However, in the example of FIG. 10, when the ALLOCATE request is received from ASVR 1006, second server interface 1012 is not connected with second communication network 1014, and is in the DOWN state. Because it is desirable that second server interface 1012 come UP to complete the ALLOCATE request, second server interface 1012 establishes a connection with second communication network (Operation 1064). Once connected, second server interface 1012 requests and receives a global IP configuration (CONFIG3) from second communication network 1014 (Operation 1066). Second server interface 1012 assigns to itself the IP configuration (CONFIG3) and comes UP (Operation 1068). Once configured and UP, second server interface 1012 again requests and receives another unique network configuration (globally-routable IP configuration CONFIG4) from second communication network 1014 (Operation 1070). CONFIG4 information is served to ASVR 1006 (Operation 1072) which, in turn, serves CONFIG4 to client interface 1004 (Operation 1074). Client interface 1004 determines that CONFIG4 does not conflict with other configurations and configures third TE2 device 1002 with CONFIG4 (Operation 1076).

As discussed relative to FIG. 5 and FIG. 9, configured server interfaces 1008, 1012 may temporarily be unable to obtain another resource on behalf of client interface 1004. Nevertheless, advantageous aspects of server interfaces 1008, 1012 can facilitate communication over communication networks 1010, 1014 between the intended endpoint hosts, including the local managed TE2 device 1002. In accordance with certain of these aspects, server interfaces 1008, 1012 are capable of passing respective network resources (or configurations) to a requesting client interface 1004, without entering the DOWN state. Client interface 1004 can use the passed-on resource to configure requesting managed TE2 device 1002, attached thereto, as a local host. Despite relinquishing its configuration to client interface 1004, respective server interface 1008, 1012 can be adapted to permit message traffic flow between communication endpoints, including managed device 1002, which received the resource originally held by respective server interface 1008, 1012. As with server interface 508 in FIG. 5, and with server interfaces 908, 912 in FIG. 9, server interfaces 1008, 1012, when operating within such a context, can be considered to be in a ROUTABLE state. While in a ROUTABLE state, server interfaces 1008, 1012 may permit end-to-end communications therethrough, but may not provide access to local applications. In yet other circumstances, where server interface is unable to obtain one network resource (configuration) from respective network 1010, 1014, the ALLOCATE request fails. Typically, server interface 1008, 1012 notifies client interface 1004 of the request failure, through ASVR 1006. Additionally, it may be desirable to provide a perceptible indication corresponding to an ALLOCATE request failure, such as by a display on respective managed device 1002 corresponding to the failed ALLOCATE request. However, to the extent it is possible to do so, ASVR 1006 may attempt to satisfy a failed ALLOCATE request to network 1010, with a subsequent request to network 1014, and vice versa.

Advantageously, the embodiments described herein are configured for use with multimode operation, and can accommodate diverse transmission modes, including, without limitation, infrared, RF, microwave, optical, and other wireless communication methods by employing interfaces responsive to at least one mode. In addition to the communication technologies and carrier access methods described above, other communication technologies and carrier access methods comprehended by the embodiments herein include, without limitation, technologies related to IMT2000, Software-Defined Radio, UMTS, W-CDMA, CDMA, FDMA, TDMA, GPRS, GSM, Short Message Service, geopositioning/GPS, circuit switched data, optical wireless, and their variants, as well as other wireless communication technologies, and operable combinations thereof.

Exemplary wireless communication protocols and carrier access methods may be defined in documents well-known in the telecommunication arts, including, without limitation, TIA/EIA-41-D, "Cellular Radiotelecommunications Intersystem Operations," Telecommunications Industry Association, December 1997; TIA/EIA-95-B, "Mobile Station-Base Station Compatibility Standard for Wideband Spread Spectrum Cellular Systems," Telecommunications Industry Association, February, 1999; Recommendation ITU-R M.1457, "Detailed Specifications Of The Radio Interfaces Of IMT-2000," and related documents published by the International Telecommunications Union (ITU); TIA/EIA/IS-2000 family of standards for cdma2000 Spread Spectrum Systems, published by the Telecommunications Industry Association (e.g., TIA/EIA/IS-2000.1-C through 2001.6-C, May 2002); and the published series of "Technical Specifications For A 3rd Generation Mobile System Based On The Evolving ANSI-41 Core Network And The Relevant Radio Access Technologies," published by the Third Generation Partnership Project 2 (3GPP2), and available via http://www.3gpp2.org/Public_html/specs/index.cfm. Furthermore, exemplary wireless communication protocols and carrier access methods can include, without limitation, transmission technologies based on CDMA, TDMA, and FDMA transmission technologies, both analog and digital, and operable combinations thereof, including Software-Defined Radio (SDR).

In addition to the physical interface technologies described with respect to the $R_m$ side of the embodiments of the mobile station manager, mobile station, portable communication adaptor, and communication system described herein, contemplated embodiments also may be adapted for use in personal nomadic (e.g., walking, shopping), land vehicle (e.g., auto, rail, truck, and bus), marine, and aircraft/avionics applications and, thus, can accommodate many other physical interface formats and related protocols, which may be, at least in part, ISDN-incompatible. Exemplary physical interface formats and related protocols encompass signals conforming, at least in part, to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selective combination thereof.

Specific, yet non-limiting, examples of the array of such physical signal formats and related protocols, both as implemented and as subsequently modified or adapted, can include: EIA-232, EIA-422/EIA-485, EIA423, EIA/TIA-568, and EIA/TIA-644 interfaces; IEEE-488: General Purpose Interface Bus; IEEE-1014: VersaModuleEuropa Bus (VMEbus); IEEE-1073: Medical Information Bus; IEEE-1149: JTAG Bus; IEEE-1284: Bidirectional Parallel Peripheral Interface for Personal Computers; IEEE-1355: Heterogeneous Inter-Connect (HIC); IEEE-1386x: Common Mezzannine Card Family (CMC); IEEE-1396: SBus; IEEE-1455: SCC32-Intelligent Transportation Systems; IEEE-1596: Scalable Coherent Interface (SCI); P1609x: Dedicated Short Range Communications (DSRC); ANSI/INCITS-X3.263: Fibre Distributed Data Interface (FDDI); ANSI/INCITS-X3.210: High-Performance Parallel Interface (HiPPI); ANSI/INCITS-X3.230: Fibre Channel (FC); IPMI (Intelligent Platform Management Interface); ANSI/VITA-1: VMEBus/VME64; ANSI/VITA-6: Signal Computing System Architecture (SCSA); VITA 19 BusNet VITA-31: InfiniBand; ANSIVITA-10: SKYchannel; and ANSI/VITA 5-1994 {RACEway Interlink} FiberChannel. Also included can be signals formatted to exchange messages across avionics-type interfaces conforming at least in part to avionic communication standards such as ARINC 629 (High Speed Data Bus for Commercial Aircraft); ARINC 636 (On-Board Local Area Networks (OLAN)); and ARINC 644 (Aircraft Data Network); and marine communication interface standards such as NMEA 0183/HS (Serial Data Bus) and NMEA 2000 (serial data communications network).

The aforementioned technologies, access methods, protocols, and terminal devices are intended to communicate the entire spectrum of interactive, retrieved and distributed information, whether voice, text, facsimile, audio, data, video, mixed documents, multimedia, and a combination thereof, whether or not the media being communicated are delay sensitive, and embracing analog and digital information signals, and a combination thereof. The information signals may be for human perceptual purposes (e.g., knowledge or entertainment), or may relate to a myriad of sensing, monitoring, operations, control, and telematics applications in medical, geophysical, transportation, intelligence, energy, and security services, among others. The mobile services are interlinked over both private and global core networks to provide end-to-end connectivity for a myriad of services including, without limitation, text, paging, telephony, multimedia, medical telemetry, distributed gaming, security monitoring, or any other service offered thereby.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method for communicating between a first communication endpoint coupled to an $R_m$ interface and a second communication endpoint coupled to a network, the method comprising:
   a. receiving a provisioning request for a resource by a mobile station manager from one of the first communication endpoint and the second communication endpoint;
   b. provisioning the resource at least partially through the $R_m$ interface in response to the provisioning request, wherein the resource uniquely identifies the first communication endpoint on the communication network;
   c. establishing a predetermined communication state between the first communication endpoint and the second communication endpoint through the mobile station manager in response to the provisioning request, wherein the first communication endpoint communicates messages over the $R_m$ interface with the mobile station manager as TE2-type signals; and
   wherein the second communication endpoint communicates messages with the mobile station manager as network protocol signals; and
   d. adapting the communicated messages between TE2-type signals and network protocol signals.

2. The method of claim 1, further comprising adapting messages for communication between the mobile station manager and the first communication endpoint over an $R_m$ interface using one of an asynchronous, a synchronous, a isochronous, and a variable-rate physical interface protocol, wherein the messages are communicated across one of a wired physical interface and a wireless physical interface, and wherein the $R_m$ interface is substantially ISDN-incompatible physical interface.

3. The method of claim 1, further comprising adapting messages for communication between the mobile station manager and the second communication endpoint over an $U_m$ interface using one of a CDMA carrier access method, a TDMA carrier access method, a FDMA carrier access method, and an operable combination thereof.

4. The method of claim 2, further comprising adapting messages for communication between the mobile station manager and the second communication endpoint over an $U_m$ interface using one of a CDMA carrier access method, a TDMA carrier access method, a FDMA carrier access method, and an operable combination thereof.

5. A method for communicating across a network with a remote host, the method comprising:
   a. receiving a provisioning request for a resource by a mobile station manager coupled to at least one mobile terminal, wherein the at least one mobile terminal communicates messages as TE2-type signals through a respective $R_m$ interface with the mobile station manager;
   b. provisioning the resource at least partially through the $R_m$ interface in response to the provisioning request, wherein the resource uniquely identifies the at least one mobile terminal relative to the communication network;
   c. establishing a predetermined communication state between the mobile station manager and a selected available communication network using a selected wireless communication protocol over a selected carrier access method; and
   d. establishing a predetermined communication state between the at least mobile terminal and the remote host through the mobile station manager in response to the provisioning request, wherein the remote host communicates messages with the mobile station manager as network protocol signals; and
   e. adapting the communicated messages between TE2-type signals and network protocol signals.

6. The method of claim 5, further comprising adapting messages for communication between the mobile station manager and the at least one mobile terminal over an $R_m$ interface using one of an asynchronous, a synchronous, a isochronous, and a variable-rate physical interface protocol, wherein the messages are communicated across one of a wired physical interface and a wireless physical interface, and wherein the $R_m$ interface is a substantially ISDN-incompatible physical interface.

7. The method of claim 6, further comprising adapting messages for communication between the mobile station manager and the second communication endpoint over an $U_m$ interface using one of a CDMA carrier access method, a TDMA carrier access method, a FDMA carrier access method, and an operable combination thereof.

8. The method of claim 7, wherein the provisioning request comprises one of an ALLOCATE request, a RELEASE request, a REVOKE request, an UPDATE request, and a combination thereof.

9. A mobile station for communicating with a mobile service provider across a $U_m$ interface, comprising:
   a. a mobile terminal coupled to, and configured to communicate messages across, an $R_m$ interface, using a selected configuration; and
   b. a wireless communication device coupled between the $R_m$ interface and the $U_m$ interface,
   wherein the wireless communication device provides the selected configuration to the mobile terminal at least partially through the $R_m$ interface,
   wherein the wireless communication device cooperates with the mobile terminal to configure the mobile terminal to communicate the messages across the $R_m$ interface, and
   wherein the wireless communication device is adapted to communicate the messages with the mobile service provider across the $U_m$ interface.

10. The mobile station of claim 9, further comprising mobile terminals coupled to, and configured to communicate messages across, the $R_m$ interface, each mobile terminal using a respective selected configuration;
   wherein the wireless communication device provides the respective selected configuration to each mobile terminal,
   wherein the wireless communication device cooperates with the mobile terminals to configure the mobile terminals to communicate messages from the mobile terminals across the $R_m$ interface, and wherein the wireless communication device is adapted to communicate the messages from the mobile terminals with the mobile service provider across the $U_m$ interface.

11. The mobile station of claim 10, further comprising mobile terminals coupled to, and configured to communicate messages across, predetermined $R_m$ interfaces, each mobile terminal using a respective selected configuration to communicate respective messages across a respective selected one of the predetermined $R_m$ interfaces;

wherein the wireless communication device provides the respective selected configuration to each mobile terminal, wherein the wireless communication device cooperates with the mobile terminals to configure the mobile terminals to communicate messages from the mobile terminals across the respective selected one of the predetermined $R_m$ interfaces, and wherein the wireless communication device is adapted to communicate the messages from the mobile terminals with the mobile service provider across the $U_m$ interface.

12. The mobile station of claim 11, wherein the wireless communication device is adapted to communicate with mobile service providers across $U_m$ interfaces, is adapted to communicate the messages from a selected one of the mobile terminals with a selected one of the mobile service providers across a respective one of the $U_m$ interfaces.

13. The mobile station of claim 11, wherein the $U_m$ interface is representative of a carrier access method comprising one of a digital carrier access method, an analog carrier access method, and an operable combination thereof.

14. The mobile station of claim 13, wherein the carrier access method further comprises one of a CDMA carrier access method, a TDMA carrier access method, a FDMA carrier access method, and an operable combination thereof.

15. The mobile station of claim 14, wherein the carrier access method is a carrier access method conforming at least in part to International Telecommunications Union (Radio) Recommendation ITU-R M.1457.

16. The mobile station of claim 14, wherein a first $U_m$ interface is representative of a first carrier access method, and a second $U_m$ interface is representative of a second carrier access method, and wherein the first carrier access method is different from the second carrier access method.

17. The mobile station of claim 14, wherein a first $U_m$ interface is representative of a first carrier access method, wherein a second $U_m$ interface is representative of a second carrier access method, wherein the first carrier access method is different from the second carrier access method, and wherein one of the first and second carrier access method conforms at least in part to International Telecommunications Union (Radio) Recommendation ITU-R M.1457.

18. A mobile station communicating with a communication network over a wireless communication link, comprising:
 a. a managed device having a selected network configuration, the managed device communicating messages of TE2-type physical layer signals; and
 b. a mobile station manager communicatingly coupled between the wireless communication link and the managed device, and adapted to render TE2-type physical layer signals suitable for exchanging with the communication network over the wireless communication link, wherein the mobile station manager dynamically provisions at least partially through an $R_m$ interface a selected network configuration on behalf of the managed device and cooperates to apply the selected network configuration to the managed device, the selected network configuration rendering the managed device capable of communicating the messages over the communication network.

19. The mobile station of claim 18, wherein the mobile station manager further comprises:
 a. a device-related interface connected with the managed device, and adapted to transform the messages of TE2-type physical layer signals over the $R_m$ interface into messages conforming to a network protocol;
 b. a network protocol interface connected with the wireless communication, and adapted to transform the messages conforming to the network protocol into messages suitable for communicating with the communication network over the $U_m$ interface; and
 c. a mobile configuration manager adapted to manage the managed device and to communicate the messages conforming to the network protocol between the device-related interface and the network protocol interface.

20. The mobile station of claim 19, wherein the managed device comprises a non-ISDN compatible mobile terminal.

21. The mobile station of claim 19, wherein TE2-type physical layer signals comprise signals conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selective combination thereof.

22. The mobile station of claim 19, wherein the $U_m$ interface is representative of a carrier access method, and the carrier access method comprises one of a digital carrier access method, an analog carrier access method, and an operable combination thereof.

23. The mobile station of claim 22, wherein the carrier access method further comprises one of a CDMA carrier access method, a TDMA carrier access method, a FDMA carrier access method, and an operable combination thereof.

24. The mobile station of claim 23, wherein the carrier access method is a carrier access method conforming at least in part to International Telecommunications Union (Radio) Recommendation ITU-R M.1457.

25. The mobile station of claim 19, wherein the mobile configuration manager is adapted to communicate over first and second $U_m$ interfaces using respective first and second network protocol interfaces; wherein a first $U_m$ interface is representative of a first carrier access method, and a second $U_m$ interface is representative of a second carrier access method.

26. The mobile station of claim 25, wherein the mobile configuration manager is adapted to communicate over first and second $R_m$ interfaces using respective first and second device related interfaces; and wherein the first $R_m$ interface is connected with a first managed device, and the second $R_m$ interface is connected with a first managed device.

27. The mobile station of claim 19, wherein the mobile configuration manager selects between the first network protocol interface for communicating across the first $U_m$ interface using the first carrier access method and the second network protocol interface for communicating across the second $U_m$ interface using the the second carrier access method, responsive to a Quality-of-Service input signal.

28. The mobile station of claim 27, wherein the managed device is a non-ISDN compatible mobile terminal and wherein TE2-type physical layer signals communicated across the $R_m$ interface comprise signals conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selected combination thereof.

29. The mobile station of claim 28, wherein each of the $U_m$ interfaces is representative of a carrier access method, and the carrier access method comprises one of a digital carrier access method, an analog carrier access method, and an operable combination thereof, and wherein the carrier access method further comprises one of a CDMA carrier access method, a TDMA carrier access method, a FDMA carrier access method, and an operable combination thereof.

30. The mobile station of claim 29, wherein the carrier access method comprises a carrier access method conforming at least in part to International Telecommunications Union (Radio) Recommendation ITU-R M.1457.

31. A mobile communication device, comprising:
 a. an interface configured as a device-related interface (DRIF), the DRIF being connectable to a managed device communicating with a first physical signal format, and configured to adapt messages communicated with the managed device between the first physical format and a network communication format;
 b. an interface configured as a network protocol interface (NPIF), the NPIF being connectable to a communication network communicating with a second physical signal format, and configured to adapt messages communicated with the communication network between the network communication format and a second physical format; and
 c. a mobile configuration manager coupled between the DRIF and the NPIF,
 wherein the mobile configuration manager receives a provisioning resource request in the network communication format from one of the DRIF and the NPIF,
 wherein the provisioning resource request includes selected combinations of an ALLOCATE request, a RELEASE request, a REVOKE request, and an UPDATE request, and
 wherein the mobile configuration manager provisions the resource at least partially through an $R_m$ interface in response thereto, such that the resource uniquely identifies the managed device on the communication network.

32. The mobile communication device of claim 31, wherein the the managed device exchanges messages with DRIF over an $R_m$ interface using a first physical signal format comprising ISDN-incompatible, TE2-type physical layer signals conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selected combination thereof.

33. The mobile communication device of claim 32, wherein the NPIF exhanges messages over a $U_m$ interface in the second physical signal format representative of a carrier access method, and the carrier access method comprises one of a digital carrier access method, an analog carrier access method, and an operable combination thereof, and wherein the carrier access method further comprises one of a CDMA carrier access method, a TDMA carrier access method, a FDMA carrier access method, and an operable combination thereof.

34. The mobile communication device of claim 33, wherein the carrier access method comprises a carrier access method conforming at least in part to International Telecommunications Union (Radio) Recommendation ITU-R M.1457.

35. A portable communication adaptor coupled between a TE2 communication terminal and a communication network, wherein the TE2 communication terminal exchanges messages with a remote host over the communication network, the adaptor comprising:
 a. an first interface coupled with the TE2 communication terminal;
 b. a second interface coupled with the communication network;
 c. an address server linked to the first interface and the second interface,
 wherein the address server cooperates with the second interface to exchange the messages with the communication network,
 wherein the address sewer acts on a unique resource to the TE2 communication terminal,
 wherein the address sewer cooperates with the first interface to configure at least partially through an $R_m$ interface the TE2 communication terminal with the unique resource,
 wherein the address sewer cooperates with the first interface to compel the TE2 communication terminal to respond as a local host relative to the remote host,
 wherein the address server cooperates with the first interface to exchange messages with the TE2 communication terminal, and
 wherein the address server causes the portable communication adaptor to respond substantially as a communication router.

36. The portable communication adaptor of claim 35, wherein the address sewer acts on the unique resource by transmitting to at least one of the first interface and the second interface a provisioning signal including one of an ALLOCATE provisioning signal, a RELEASE provisioning signal, a REVOKE provisioning signal, an UPDATE provisioning signal, and a selected combination thereof.

37. The portable communication adaptor of claim 36, wherein the TE2 communication terminal exchanges the messages with the first interface through the $R_m$ interface using a TE2-type physical layer signal format conforming at least in part to one of an ITU Recommendation, an IEEE standard, an ISO standard, an ANSI standard, an IETF standard, an EIA standard, a TIA standard, an IEC standard, an ETSI standard, an AIAA standard, an ARINC standard, a SAE standard, a serial interface standard, a parallel interface standard, and an interface standard representative of a selected combination thereof.

38. The portable communication adaptor of claim 37, wherein the second interface exchanges the messages with the communication network through a $U_m$ interface using a carrier access method, and the carrier access method comprises at least one of a digital carrier access method, an analog carrier access method, and an operable combination thereof, and wherein the carrier access method further comprises one of a CDMA carrier access method, a TDMA carrier access method, a FDMA carrier access method, and an operable combination thereof.

39. The mobile communication device of claim 38, wherein the carrier access method comprises a carrier access method conforming at least in part to International Telecommunications Union (Radio) Recommendation ITU-R M.1457.

40. The portable communication adaptor of claim 38, further comprising multiple first interfaces each selectably coupled with a respective one of multiple TE2 communication terminals, the TE2-type physical layer signal format of one of the multiple TE2 communication terminals being different from the TE2-type physical layer signal format of another of the multiple TE2 communication terminals.

41. The portable communication adaptor of claim 40, further comprising multiple second interfaces each selectably coupled with a respective one of multiple communication networks, one of the multiple communication networks exchanging messages with one of the multiple second interfaces using a first carrier access method, and another of the multiple communication networks exchanging messages with a another of the multiple second interfaces using a second carrier access method, wherein the first carrier access method is different from the second carrier access method.

42. The portable communication adaptor of claim 41, wherein the multiple second interfaces are selectably coupled with a respective one of multiple communication networks responsive to a Quality-of Service signal.

43. The portable communication adaptor of claim 42, wherein the address server cooperates with the first interface and the second interface to exchange the messages using one of an asynchronous service, a synchronous service, an isochronous service, a variable-rate service, and a combination thereof.

44. An apparatus for communicating between a first communication endpoint coupled to an $R_m$ interface and a second communication endpoint coupled to a network, comprising:
   means for receiving a provisioning request for a resource by a mobile station manager from one of the first communication endpoint and the second communication endpoint;
   means for provisioning the resource at least partially through the $R_m$ interface in response to the provisioning request, wherein the resource uniquely identifies the first communication endpoint on the communication network;
   means for establishing a predetermined communication state between the first communication endpoint and the second communication endpoint through the mobile station manager in response to the provisioning request, wherein the first communication endpoint communicates messages over the $R_m$ interface with the mobile station manager as TE2-type signals, and wherein the second communication endpoint communicates messages with the mobile station manager as network protocol signals; and
   means for adapting the communicated messages between TE2-type signals and network protocol signals.

45. The apparatus of claim 44, further comprising means for adapting messages for communication between the mobile station manager and the first communication endpoint over an $R_m$ interface using one of an asynchronous, a synchronous, a isochronous, and a variable-rate physical interface protocol, wherein the messages are communicated across one of a wired physical interface and a wireless physical interface, and wherein the $R_m$ interface is substantially ISDN-incompatible physical interface.

46. The apparatus of claim 44, further comprising means for adapting messages for communication between the mobile station manager and the second communication endpoint over an $U_m$ interface using one of a CDMA carrier access method, a TDMA carrier access method, a FDMA carrier access method, and an operable combination thereof.

47. The apparatus of claim 45, further comprising means for adapting messages for communication between the mobile station manager and the second communication endpoint over an $U_m$ interface using one of a CDMA carrier access method, a TDMA carrier access method, a FDMA carrier access method, and an operable combination thereof.

48. An apparatus for communicating across a network with a remote host, comprising:
   means for receiving a provisioning request for a resource by a mobile station manager coupled to at least one mobile terminal, wherein the at least one mobile terminal communicates messages as TE2-type signals through a respective $R_m$ interface with the mobile station manager;
   means for provisioning the resource at least partially through the $R_m$ interface in response to the provisioning request, wherein the resource uniquely identifies the at least one mobile terminal relative to the communication network;
   means for establishing a predetermined communication state between the mobile station manager and a selected available communication network using a selected wireless communication protocol over a selected carrier access method; and
   means for establishing a predetermined communication state between the at least mobile terminal and the remote host through the mobile station manager in response to the provisioning request, wherein the remote host communicates messages with the mobile station manager as network protocol signals; and
   means for adapting the communicated messages between TE2-type signals and network protocol signals.

49. The method of claim 48, further comprising means for adapting messages for communication between the mobile station manager and the at least one mobile terminal over an $R_m$ interface using one of an asynchronous, a synchronous, a isochronous, and a variable-rate physical interface protocol, wherein the messages are communicated across one of a wired physical interface and a wireless physical interface, and wherein the $R_m$ interface is a substantially ISDN-incompatible physical interface.

50. The method of claim 49, further comprising means for adapting messages for communication between the mobile station manager and the second communication endpoint over an $U_m$ interface using one of a CDMA carrier access method, a TDMA carrier access method, a FDMA carrier access method, and an operable combination thereof.

51. The method of claim 50, wherein the provisioning request comprises one of an ALLOCATE request, a RELEASE request, a REVOKE request, an UPDATE request, and a combination thereof.

* * * * *